(12) United States Patent
Brown et al.

(10) Patent No.: US 8,881,027 B1
(45) Date of Patent: Nov. 4, 2014

(54) TELEFORUM PARTICIPANT SCREENING

(75) Inventors: Brian Brown, Cherry Hills Village, CO (US); Lorin Jurow, Denver, CO (US)

(73) Assignee: Broadnet Teleservices, LLC, Highlands Ranch, CO (US)

( * ) Notice: Subject to any disclaimer, the term of this patent is extended or adjusted under 35 U.S.C. 154(b) by 175 days.

(21) Appl. No.: 13/224,678

(22) Filed: Sep. 2, 2011

Related U.S. Application Data

(63) Continuation of application No. 11/853,638, filed on Sep. 11, 2007, now Pat. No. 8,266,535.

(60) Provisional application No. 60/825,248, filed on Sep. 11, 2006.

(51) Int. Cl.
*G06F 3/00* (2006.01)
*G06F 3/048* (2013.01)

(52) U.S. Cl.
USPC ........... 715/753; 715/751; 715/755; 715/757; 715/758

(58) Field of Classification Search
USPC .......................... 715/751, 753, 755, 757, 758
See application file for complete search history.

(56) References Cited

U.S. PATENT DOCUMENTS

| | | | |
|---|---|---|---|
| 3,210,476 A | 10/1965 | Shaer | |
| 3,692,947 A | 9/1972 | Lewis | |
| 4,109,111 A | 8/1978 | Cook | |
| 4,303,804 A * | 12/1981 | Johnson et al. | 379/32.01 |
| 4,455,455 A | 6/1984 | Little | |
| 4,475,189 A * | 10/1984 | Herr et al. | 370/261 |
| 4,509,167 A * | 4/1985 | Bantel et al. | 370/261 |
| 4,541,087 A | 9/1985 | Comstock | |
| 4,630,827 A | 12/1986 | Yoneyama | |
| 4,796,293 A * | 1/1989 | Blinken et al. | 379/202.01 |
| 4,878,242 A * | 10/1989 | Springer et al. | 379/204.01 |
| 4,937,856 A | 6/1990 | Natarajan | |
| 5,034,947 A * | 7/1991 | Epps | 370/268 |
| 5,195,086 A * | 3/1993 | Baumgartner et al. | 370/264 |
| 5,408,526 A | 4/1995 | McFarland et al. | |
| 5,440,624 A | 8/1995 | Schoof, II | |
| 5,471,318 A * | 11/1995 | Ahuja et al. | 358/400 |
| 5,475,747 A | 12/1995 | Bales et al. | |

(Continued)

FOREIGN PATENT DOCUMENTS

EP 1317123 A1 4/2003

OTHER PUBLICATIONS

Polycom et. al. "ReadiVoice Windows Operator Guide" 2006.*
Avaya et. al. "Bridge Talk Users Guide" version 4.0 Jul. 2005.*

(Continued)

*Primary Examiner* — Steven B Theriault
(74) *Attorney, Agent, or Firm* — HolzerIPLaw, PC

(57) ABSTRACT

A method and apparatus of providing a teleforum. The method includes generating simultaneous outbound invitation calls to multiple invitees and transmitting a message to each invitee, inviting him or her to become a teleforum participant. Teleforum participants who accept the invitation are connected to the teleforum in a listen-only mode. During the teleforum, a teleforum participant may request active participation in the teleforum. The method also includes allowing the participant to actively participate in the teleforum. Active participation may include but is not limited to such activities as: speaking to the teleforum, asking a question, responding to a poll, making a donation, providing information, leaving a message, being transferred to a subconference, receiving feedback from participants, leaving a voicemail, volunteering for future activities or receiving media transmitted outside of the teleforum.

48 Claims, 10 Drawing Sheets

(56) References Cited

U.S. PATENT DOCUMENTS

| | | | |
|---|---|---|---|
| 5,483,587 A * | 1/1996 | Hogan et al. | 379/202.01 |
| 5,483,588 A * | 1/1996 | Eaton et al. | 379/202.01 |
| 5,495,522 A | 2/1996 | Allen et al. | |
| 5,533,110 A | 7/1996 | Pinard et al. | |
| 5,539,813 A * | 7/1996 | Jonsson | 379/202.01 |
| 5,581,702 A * | 12/1996 | McArdle et al. | 709/204 |
| 5,619,555 A * | 4/1997 | Fenton et al. | 379/88.11 |
| 5,625,407 A | 4/1997 | Biggs et al. | |
| 5,680,392 A | 10/1997 | Semaan | |
| 5,699,352 A | 12/1997 | Kriete et al. | |
| 5,729,687 A | 3/1998 | Rothrock et al. | |
| 5,767,897 A | 6/1998 | Howell | |
| 5,825,858 A | 10/1998 | Shaffer et al. | |
| 5,867,562 A | 2/1999 | Scherer | |
| 5,903,629 A | 5/1999 | Campbell, IV et al. | |
| 5,903,637 A * | 5/1999 | Hogan et al. | 379/203.01 |
| 5,916,302 A | 6/1999 | Dunn et al. | |
| 5,923,737 A | 7/1999 | Weishut et al. | |
| 5,924,041 A | 7/1999 | Alperovich et al. | |
| 5,949,414 A * | 9/1999 | Namikata et al. | 715/753 |
| 5,953,049 A | 9/1999 | Horn et al. | |
| 5,956,024 A | 9/1999 | Strickland et al. | |
| 5,978,463 A | 11/1999 | Jurkevics et al. | |
| 5,990,933 A * | 11/1999 | Ozone et al. | 348/14.09 |
| 5,999,208 A * | 12/1999 | McNerney et al. | 348/14.08 |
| 5,999,966 A | 12/1999 | McDougall et al. | |
| 6,023,452 A | 2/2000 | Shiragaki | |
| 6,067,027 A | 5/2000 | Buer | |
| 6,115,388 A | 9/2000 | Chinitz et al. | |
| 6,118,864 A | 9/2000 | Chang et al. | |
| 6,141,341 A | 10/2000 | Jones et al. | |
| 6,141,597 A * | 10/2000 | Botzko et al. | 700/94 |
| 6,178,237 B1 * | 1/2001 | Horn | 379/202.01 |
| 6,181,685 B1 | 1/2001 | Chinitz et al. | |
| 6,185,285 B1 | 2/2001 | Relyea et al. | |
| 6,188,751 B1 | 2/2001 | Scherer | |
| 6,195,357 B1 | 2/2001 | Polcyn | |
| 6,201,859 B1 * | 3/2001 | Memhard et al. | 379/93.21 |
| 6,236,854 B1 | 5/2001 | Bradshaw, Jr. | |
| 6,275,575 B1 | 8/2001 | Wu | |
| 6,282,278 B1 * | 8/2001 | Doganata et al. | 379/202.01 |
| 6,295,551 B1 | 9/2001 | Roberts et al. | |
| 6,304,648 B1 | 10/2001 | Chang | |
| 6,308,079 B1 * | 10/2001 | Pan et al. | 455/519 |
| 6,320,944 B1 | 11/2001 | Schlossman et al. | |
| 6,327,567 B1 | 12/2001 | Willehadson et al. | |
| 6,330,022 B1 | 12/2001 | Seligmann | |
| 6,330,321 B2 | 12/2001 | Detampel, Jr. et al. | |
| 6,332,153 B1 | 12/2001 | Cohen | |
| 6,343,314 B1 * | 1/2002 | Ludwig et al. | 709/204 |
| 6,363,079 B1 | 3/2002 | Barzegar et al. | |
| 6,370,393 B1 * | 4/2002 | Otsuka et al. | 455/555 |
| 6,404,764 B1 | 6/2002 | Jones et al. | |
| 6,404,873 B1 * | 6/2002 | Beyda et al. | 379/202.01 |
| 6,411,605 B1 | 6/2002 | Vance et al. | |
| 6,418,214 B1 | 7/2002 | Smythe et al. | |
| 6,421,438 B1 | 7/2002 | Denton et al. | |
| 6,424,646 B1 | 7/2002 | Gerszberg et al. | |
| 6,438,111 B1 * | 8/2002 | Catanzaro et al. | 370/260 |
| 6,453,034 B1 | 9/2002 | Donovan et al. | |
| 6,463,051 B1 | 10/2002 | Ford | |
| 6,466,550 B1 | 10/2002 | Foster et al. | |
| 6,483,826 B1 * | 11/2002 | .ANG.kerberg | 370/335 |
| 6,501,739 B1 | 12/2002 | Cohen | |
| 6,501,740 B1 * | 12/2002 | Sun et al. | 370/261 |
| 6,507,740 B2 | 1/2003 | Shi | |
| 6,539,087 B1 | 3/2003 | Walsh et al. | |
| 6,556,670 B1 * | 4/2003 | Horn | 379/202.01 |
| 6,580,695 B2 | 6/2003 | Kluck et al. | |
| 6,594,269 B1 * | 7/2003 | Polcyn | 370/401 |
| 6,597,667 B1 | 7/2003 | Cema | |
| 6,606,305 B1 | 8/2003 | Boyle et al. | |
| 6,608,636 B1 * | 8/2003 | Roseman | 715/753 |
| 6,608,820 B1 | 8/2003 | Bradshaw, Jr. | |
| 6,625,271 B1 | 9/2003 | O'Malley et al. | |
| 6,650,747 B1 | 11/2003 | Bala et al. | |
| 6,657,975 B1 | 12/2003 | Baxley et al. | |
| 6,690,771 B2 | 2/2004 | Siemens et al. | |
| 6,697,476 B1 | 2/2004 | O'Malley et al. | |
| 6,728,221 B1 * | 4/2004 | Shaffer et al. | 370/260 |
| 6,741,697 B2 | 5/2004 | Benson et al. | |
| 6,772,436 B1 * | 8/2004 | Doganata et al. | 725/106 |
| 6,798,768 B1 | 9/2004 | Gallick et al. | |
| 6,804,340 B2 | 10/2004 | Howard et al. | |
| 6,807,563 B1 | 10/2004 | Christofferson et al. | |
| 6,829,349 B1 | 12/2004 | Neale et al. | |
| 6,839,416 B1 | 1/2005 | Shaffer | |
| 6,839,417 B2 | 1/2005 | Weisman et al. | |
| 6,865,540 B1 * | 3/2005 | Faber et al. | 705/7.25 |
| 6,876,734 B1 * | 4/2005 | Summers et al. | 379/202.01 |
| 6,888,925 B2 | 5/2005 | Spitzer et al. | |
| 6,898,620 B1 | 5/2005 | Ludwig et al. | |
| 6,907,449 B2 | 6/2005 | Srinivasan | |
| 6,910,081 B1 | 6/2005 | Hammond | |
| 6,938,069 B1 * | 8/2005 | Narayanaswamy | 709/204 |
| 6,950,503 B2 | 9/2005 | Schwartz et al. | |
| 6,961,416 B1 * | 11/2005 | Summers et al. | 379/202.01 |
| 6,967,672 B1 | 11/2005 | Huber et al. | |
| 6,996,221 B1 | 2/2006 | Baiyor et al. | |
| 7,003,087 B2 | 2/2006 | Spencer et al. | |
| 7,003,728 B2 | 2/2006 | Berque | |
| 7,006,455 B1 | 2/2006 | Fandrianto et al. | |
| 7,006,616 B1 * | 2/2006 | Christofferson et al. | 379/202.01 |
| 7,007,235 B1 | 2/2006 | Hussein et al. | |
| 7,010,622 B1 | 3/2006 | Bauer et al. | |
| 7,035,385 B2 | 4/2006 | Levine et al. | |
| 7,058,026 B1 * | 6/2006 | Hera et al. | 370/265 |
| 7,061,521 B2 | 6/2006 | Bulriss et al. | |
| 7,062,025 B2 * | 6/2006 | Summers et al. | 379/202.01 |
| 7,069,299 B2 * | 6/2006 | Rhee et al. | 709/204 |
| 7,092,821 B2 | 8/2006 | Mizrahi et al. | |
| 7,107,312 B2 | 9/2006 | Hackbarth et al. | |
| 7,113,512 B1 | 9/2006 | Holmgren et al. | |
| 7,119,828 B1 * | 10/2006 | Kizhnerman et al. | 348/14.08 |
| 7,127,487 B1 | 10/2006 | Wang et al. | |
| 7,151,753 B2 | 12/2006 | Chaney et al. | |
| 7,158,619 B2 | 1/2007 | Simpson | |
| 7,167,552 B1 | 1/2007 | Shaffer et al. | |
| 7,185,054 B1 | 2/2007 | Ludwig et al. | |
| 7,200,214 B2 | 4/2007 | Knappe et al. | |
| 7,206,809 B2 | 4/2007 | Ludwig et al. | |
| 7,215,744 B2 | 5/2007 | Scherer | |
| 7,221,951 B2 | 5/2007 | Anvekar et al. | |
| 7,257,090 B2 | 8/2007 | Seavers et al. | |
| 7,266,091 B2 | 9/2007 | Singh et al. | |
| 7,277,697 B2 | 10/2007 | Desai et al. | |
| 7,295,660 B1 | 11/2007 | Higginbotham et al. | |
| 7,298,834 B1 * | 11/2007 | Homeier et al. | 379/202.01 |
| 7,310,320 B2 | 12/2007 | Decker et al. | |
| 7,317,791 B2 | 1/2008 | Carlson | |
| 7,328,239 B1 * | 2/2008 | Berberian et al. | 709/204 |
| 7,330,541 B1 | 2/2008 | Surazski et al. | |
| 7,336,779 B2 | 2/2008 | Boyer et al. | |
| 7,346,654 B1 | 3/2008 | Weiss | |
| 7,349,000 B2 * | 3/2008 | McDonald et al. | 715/719 |
| 7,353,251 B1 | 4/2008 | Balakrishnan | |
| 7,398,296 B2 | 7/2008 | Ludwig et al. | |
| 7,411,939 B1 * | 8/2008 | Lamb et al. | 370/352 |
| 7,412,047 B2 | 8/2008 | Nguyen et al. | |
| 7,412,050 B2 | 8/2008 | Renner et al. | |
| 7,412,482 B2 | 8/2008 | Ludwig et al. | |
| 7,454,460 B2 * | 11/2008 | Ivashin | 709/203 |
| 7,483,400 B2 | 1/2009 | Kuusinen et al. | |
| 7,483,526 B2 | 1/2009 | Keohane et al. | |
| 7,492,730 B2 | 2/2009 | Eshel et al. | |
| 7,516,410 B2 * | 4/2009 | Thompson et al. | 715/753 |
| 7,580,375 B1 | 8/2009 | Friedrich et al. | |
| 7,634,074 B2 * | 12/2009 | Coulas et al. | 379/202.01 |
| 7,636,750 B2 * | 12/2009 | Haldar | 709/204 |
| 7,643,436 B2 * | 1/2010 | Provino et al. | 370/260 |
| 7,643,628 B2 | 1/2010 | Hans et al. | |
| 7,653,013 B1 * | 1/2010 | Moran | 370/261 |
| 7,679,638 B2 * | 3/2010 | Eshkoli et al. | 348/14.08 |
| 7,679,640 B2 * | 3/2010 | Eshkoli et al. | 348/14.09 |

(56) References Cited

U.S. PATENT DOCUMENTS

| | | | |
|---|---|---|---|
| 7,685,235 B2* | 3/2010 | Curran et al. | 709/205 |
| 7,688,961 B2* | 3/2010 | Vicory et al. | 379/202.01 |
| 7,694,002 B2 | 4/2010 | Vadlakonda et al. | |
| 7,701,926 B2 | 4/2010 | Gavish et al. | |
| 7,715,541 B2* | 5/2010 | Arrant et al. | 379/202.01 |
| 7,734,802 B1* | 6/2010 | Gay et al. | 709/231 |
| 7,738,897 B2* | 6/2010 | Tillet et al. | 455/519 |
| 7,742,587 B2* | 6/2010 | Cohen | 379/202.01 |
| 7,756,540 B2 | 7/2010 | Tillet et al. | |
| 7,768,999 B1* | 8/2010 | Dhanoa et al. | 370/352 |
| 7,787,605 B2* | 8/2010 | Rodman | 379/202.01 |
| 7,852,998 B1* | 12/2010 | Smith et al. | 379/202.01 |
| 7,908,320 B2* | 3/2011 | Ludwig et al. | 709/204 |
| 7,929,011 B2 | 4/2011 | Elbaze et al. | |
| 7,933,226 B2* | 4/2011 | Woodruff et al. | 370/260 |
| 7,944,861 B2* | 5/2011 | Smith et al. | 370/260 |
| 7,945,620 B2 | 5/2011 | Bou-Ghannam et al. | |
| 7,978,838 B2* | 7/2011 | Rodman et al. | 379/202.01 |
| 7,983,199 B1* | 7/2011 | Nguyen et al. | 370/260 |
| 7,985,138 B2 | 7/2011 | Acharya et al. | |
| 8,077,849 B2* | 12/2011 | Altberg et al. | 379/201.01 |
| 8,085,692 B2* | 12/2011 | Vaught et al. | 370/260 |
| 8,102,984 B2 | 1/2012 | Rodman et al. | |
| 8,116,442 B2* | 2/2012 | Remaker | 379/202.01 |
| 8,126,968 B2 | 2/2012 | Rodman et al. | |
| 8,140,980 B2* | 3/2012 | Gunasekar et al. | 715/753 |
| 8,144,854 B2 | 3/2012 | Rodman | |
| 8,170,191 B2 | 5/2012 | Potekhin et al. | |
| 8,223,942 B2 | 7/2012 | Rodman et al. | |
| 8,275,106 B1* | 9/2012 | Runcie | 379/202.01 |
| 8,326,927 B2 | 12/2012 | Asthana et al. | |
| 8,345,669 B1* | 1/2013 | Armstrong et al. | 370/352 |
| 8,385,526 B2* | 2/2013 | Smelyansky et al. | 379/202.01 |
| 8,549,076 B2 | 10/2013 | Mizrahi et al. | |
| 2001/0005372 A1 | 6/2001 | Cave et al. | |
| 2002/0044534 A1* | 4/2002 | Cohen | 370/263 |
| 2002/0075304 A1* | 6/2002 | Thompson et al. | 345/751 |
| 2002/0078150 A1* | 6/2002 | Thompson et al. | 709/204 |
| 2002/0085030 A1 | 7/2002 | Ghani | |
| 2002/0103863 A1 | 8/2002 | Pearson | |
| 2002/0106066 A1 | 8/2002 | Swanson et al. | |
| 2002/0111153 A1 | 8/2002 | Hartmaier et al. | |
| 2002/0118808 A1 | 8/2002 | Kelleher et al. | |
| 2002/0169836 A1 | 11/2002 | Hood et al. | |
| 2002/0181686 A1 | 12/2002 | Howard et al. | |
| 2003/0012149 A1 | 1/2003 | Maggenti et al. | |
| 2003/0021400 A1* | 1/2003 | Grandgent et al. | 379/202.01 |
| 2003/0035527 A1* | 2/2003 | Baker | 379/207.01 |
| 2003/0039337 A1* | 2/2003 | Davies et al. | 379/88.01 |
| 2003/0046344 A1* | 3/2003 | Kumhyr et al. | 709/205 |
| 2003/0055899 A1 | 3/2003 | Burger et al. | |
| 2003/0074444 A1 | 4/2003 | Ahrens, Jr. et al. | |
| 2003/0076353 A1 | 4/2003 | Blackstock et al. | |
| 2003/0105820 A1* | 6/2003 | Haims et al. | 709/205 |
| 2003/0142635 A1* | 7/2003 | Roher et al. | 370/260 |
| 2003/0158900 A1* | 8/2003 | Santos | 709/205 |
| 2003/0163526 A1 | 8/2003 | Clarisse et al. | |
| 2003/0182374 A1* | 9/2003 | Haldar | 709/205 |
| 2003/0235277 A1 | 12/2003 | Fuller et al. | |
| 2004/0003046 A1* | 1/2004 | Grabelsky et al. | 709/206 |
| 2004/0004942 A1* | 1/2004 | Nebiker et al. | 370/260 |
| 2004/0006595 A1 | 1/2004 | Yeh | |
| 2004/0008635 A1* | 1/2004 | Nelson et al. | 370/260 |
| 2004/0047461 A1 | 3/2004 | Weisman et al. | |
| 2004/0051732 A1 | 3/2004 | White et al. | |
| 2004/0052218 A1 | 3/2004 | Knappe | |
| 2004/0057449 A1 | 3/2004 | Black | |
| 2004/0080504 A1 | 4/2004 | Salesky et al. | |
| 2004/0082352 A1* | 4/2004 | Keating et al. | 455/519 |
| 2004/0086093 A1 | 5/2004 | Schranz | |
| 2004/0101119 A1 | 5/2004 | Malcolm et al. | |
| 2004/0107255 A1 | 6/2004 | Ludwig et al. | |
| 2004/0119814 A1 | 6/2004 | Clisham et al. | |
| 2004/0125933 A1 | 7/2004 | Jun et al. | |
| 2004/0141593 A1 | 7/2004 | Simpson | |
| 2004/0147231 A1 | 7/2004 | Marler et al. | |
| 2004/0184586 A1 | 9/2004 | Coles et al. | |
| 2004/0190701 A1* | 9/2004 | Biage | 379/202.01 |
| 2004/0198464 A1 | 10/2004 | Panian | |
| 2004/0218744 A1 | 11/2004 | Nguyen et al. | |
| 2004/0228292 A1* | 11/2004 | Edwards | 370/277 |
| 2004/0248552 A1 | 12/2004 | Mazurick et al. | |
| 2005/0018826 A1 | 1/2005 | Benco et al. | |
| 2005/0031110 A1* | 2/2005 | Haimovich et al. | 379/202.01 |
| 2005/0034079 A1 | 2/2005 | Gunasekar et al. | |
| 2005/0069116 A1* | 3/2005 | Murray, II | 379/202.01 |
| 2005/0078171 A1 | 4/2005 | Firestone et al. | |
| 2005/0078613 A1 | 4/2005 | Covell et al. | |
| 2005/0084086 A1 | 4/2005 | Hesse | |
| 2005/0088981 A1* | 4/2005 | Woodruff et al. | 370/260 |
| 2005/0128283 A1 | 6/2005 | Bulriss et al. | |
| 2005/0135279 A1 | 6/2005 | Zabawskyj | |
| 2005/0180342 A1* | 8/2005 | Summers et al. | 370/261 |
| 2005/0187816 A1 | 8/2005 | Smukler | |
| 2005/0207357 A1* | 9/2005 | Koga | 370/260 |
| 2005/0213517 A1* | 9/2005 | Rodman et al. | 370/260 |
| 2005/0233736 A1* | 10/2005 | Berstis et al. | 455/416 |
| 2005/0248652 A1 | 11/2005 | Firestone et al. | |
| 2005/0259803 A1* | 11/2005 | Khartabil | 379/202.01 |
| 2005/0286498 A1 | 12/2005 | Rand et al. | |
| 2005/0286699 A1 | 12/2005 | Gagle | |
| 2006/0056440 A1 | 3/2006 | Khartabil | |
| 2006/0063551 A1 | 3/2006 | Martin | |
| 2006/0067250 A1 | 3/2006 | Boyer et al. | |
| 2006/0067499 A1 | 3/2006 | Oliveira et al. | |
| 2006/0067500 A1 | 3/2006 | Christofferson et al. | |
| 2006/0072728 A1* | 4/2006 | Cope et al. | 379/202.01 |
| 2006/0147009 A1 | 7/2006 | Greenlee et al. | |
| 2006/0149615 A1* | 7/2006 | Spradling et al. | 709/205 |
| 2006/0153354 A1 | 7/2006 | Brahm et al. | |
| 2006/0164507 A1* | 7/2006 | Eshkoli et al. | 348/14.09 |
| 2006/0164508 A1* | 7/2006 | Eshkoli et al. | 348/14.09 |
| 2006/0181608 A1 | 8/2006 | Knappe et al. | |
| 2006/0189337 A1* | 8/2006 | Farrill et al. | 455/518 |
| 2006/0210044 A1 | 9/2006 | Widger | |
| 2006/0222155 A1* | 10/2006 | Summers et al. | 379/202.01 |
| 2006/0239212 A1 | 10/2006 | Pirzada et al. | |
| 2006/0268753 A1 | 11/2006 | Tidwell et al. | |
| 2006/0274675 A1 | 12/2006 | Kizhnerman | |
| 2006/0293073 A1* | 12/2006 | Rengaraju et al. | 455/518 |
| 2007/0036131 A1 | 2/2007 | Shaffer et al. | |
| 2007/0049261 A1* | 3/2007 | Joglekar | 455/416 |
| 2007/0058795 A1 | 3/2007 | Arrant et al. | |
| 2007/0067387 A1 | 3/2007 | Jain et al. | |
| 2007/0091830 A1* | 4/2007 | Coulas et al. | 370/260 |
| 2007/0091831 A1* | 4/2007 | Croy et al. | 370/260 |
| 2007/0105578 A1* | 5/2007 | Shaffer et al. | 455/518 |
| 2007/0110029 A1 | 5/2007 | Gilmore, II et al. | |
| 2007/0111743 A1* | 5/2007 | Leigh et al. | 455/518 |
| 2007/0116225 A1* | 5/2007 | Zhao et al. | 379/202.01 |
| 2007/0121859 A1* | 5/2007 | Smelyansky et al. | 379/158 |
| 2007/0127374 A1 | 6/2007 | Black | |
| 2007/0133774 A1 | 6/2007 | Fujimoto | |
| 2007/0162553 A1* | 7/2007 | Dewing et al. | 709/207 |
| 2007/0208806 A1 | 9/2007 | Mordecai et al. | |
| 2007/0239885 A1* | 10/2007 | Vadlakonda et al. | 709/232 |
| 2007/0260686 A1 | 11/2007 | Frydenlund et al. | |
| 2007/0263821 A1* | 11/2007 | Shaffer et al. | 379/202.01 |
| 2007/0285504 A1 | 12/2007 | Hesse | |
| 2007/0294263 A1 | 12/2007 | Punj et al. | |
| 2007/0299710 A1* | 12/2007 | Haveliwala | 705/8 |
| 2007/0300165 A1 | 12/2007 | Haveliwala | |
| 2008/0065998 A1* | 3/2008 | Brown et al. | 715/755 |
| 2008/0104171 A1* | 5/2008 | Berberian et al. | 709/204 |
| 2008/0226051 A1* | 9/2008 | Srinivasan | 379/202.01 |
| 2009/0060157 A1 | 3/2009 | Kim et al. | |
| 2009/0074174 A1 | 3/2009 | Allen et al. | |
| 2009/0274279 A1 | 11/2009 | Reynolds | |
| 2010/0034122 A1 | 2/2010 | Croy et al. | |
| 2010/0226287 A1 | 9/2010 | Horvath et al. | |
| 2010/0260075 A1 | 10/2010 | Smith et al. | |

(56) References Cited

U.S. PATENT DOCUMENTS

2011/0182212 A1 7/2011 Smelyansky et al.
2011/0194465 A1 8/2011 Smith et al.

OTHER PUBLICATIONS

U.S. Appl. No. 11/350,194, filed Feb. 8, 2006, Smith et al.
U.S. Appl. No. 10/954,837, filed Sep. 30, 2004, Smith et al.
Macker et al., "IVOX-the Interactive VOice eXchange Application," Naval Research Laboratory, Washington, DC, Feb. 20, 1996, 17 pages.
Yocom et al., "Large IP-PBXs: A well-matched Quartet," Business Communications Review, Jan. 2004, 34, 1; ProQuest Technology Collection, pp. 26-40.
Broadnet: Global Delivery, Instant Results, www.broadnet.us/oldsite/2006/teleforum.html, 2 pages, retrieved Jan. 26, 2011.
Camtasia Studio 4 Marketing Video, available at http://clientmanager.broadnet.us/marketing/MarketingPiece/FinalCopy.html, retrieved Jan. 26, 2011.
Latest Conferencing Products, Communications New, Feb. 2001; retrieved Aug. 26, 2014, 2 pages.
Polycom Readivoice® Administration & Maintenance Guide, (2006), 293 pages.
ACT Teleconferencing—Audio conferencing and ReadyConnect products; http://web.orchive.org/web/20050306144112/http://www.acttel.com/international.asp; retrieved Aug. 22, 2014, 3 pages.
ConferTech International Announces New Generation Allegro(R) 3.00.0 Conferencing System; http://www.thefreelibrary.com/Confertech+International+Announces+New+Generation+Allegro(5)+3.00.0; retrieved Aug. 25, 2014, 2 pages.
Brown, Jim "Telephone Bridge links up to 15 callers," Network World, Dec. 21, 1987, 1 page. B.
BoomeRang™ Technology that Empowers; http://www.broadnet.us/products/boomerang/, retrieved Aug. 15, 2014, 3 pages.
Burstyn, H. Paris, "Encounters of the electronic kind," Network World, Sep. 29, 1986, 2 pages.
Sonata™ Integrated Teleconferencing System, dated Jul. 22, 1997; http://www.confertech.com/services/telesytems/sonata.html, retrieved Jun. 3, 2013, 1 page.
Cummings, Joanne, "Videoconferencing rollouts abound at ComNet show," Network World, Feb. 8, 1993, 2 pages.
Duffy, Jim, "Start-up unveils standard videoconferencing switch," Network World, Jun. 15, 1992, 2 pages.
Ferrari, et al , "Distributed advance reservation of real-time connections," (accepted for presentation in NOSSDAV-95) 7 pages, retrieved Aug. 25, 2014.
Herbalife and ACT Teleconferencing Break Guinness World Record, PRNewswire Mar. 29, 2004, http://www.prnewswire.com/, 2 pages.
Mace, Scott, "CaucusLink lowers cost of conferencing," InforWorld, Nov. 4, 1991, 1 pages.
Meyer, Jim "The Portable Lawyer," ABA Journal, Sep. 1991, 4 pages.
Concorde-4500 User's Notebook, PictureTel Corporation, Edition 800-0930-01/A, 114 pages.
"Polycom Enchances ReadiVoice Reservationless Audio Conferencing Solution for Service Providers," BusinessWire, Aug. 17, 2004, 3 pages.
Polycom Networking Solutions Guide (including information on Polycom MGC50/100), 2004, 8 pages.
Polycom Readivoice® Administration & Maintenance Guide, (2006) 321 pages.
Polycom Readivoice® Administration Manual "Intelligent Voice Conferencing System," (Released with v.2.20.0 of the softward © 2001 by Voyant Technologies, Inc.), 206 pages.
Roseman, et al "GROUPKIT: A Groupware Toolkit for Building Real-Time Conferencing Applications," grouplab.cpsc.ucalgary.ca/grouplab/uploads/Publication/Publications/2991-Groupkit.CSCW, 8 pages.
Schooler, Eva M., "A Dsitributed Architecture for Multimedia Conference Control," Information Sciences Institute, University of Southern California, Nov. 1991, 21 pages.
Smith, Paxton J., "Voice conferencing over IP networks," http://citeseerx.ist.psu.edu/viewdoc/summary?doi=10.1.1.120.5665, (abstract and citations retrieved Aug. 15, 2014), 3 pages.
Srinivas, et al , "MONET: A Multi-media System for Conferencing and Application Sharing is Distributed Systems1," CERC Technical Report Series Research Note, Feb. 1992, 19 pages.
Sullivan, Joe, "T.120 conferencing standards ease data sharing," Network World, Jun. 19, 1995, 1 page.
TeleTownHall Conferencing Products Press Releases and TeleTownHall website, http://web.archive.org/web/20070329214322; http://web.archive.org.web/20070401205252; http://web.archive.org/web/20070401205612; http://web.archive.org/web/20080101150207; http://web.archive.org/web/2008010150134; http://web.archive.org/web/20080101150137, 11 pages.
The Pulver Report, May 6, 1999 issue, SIP is Happening, http://lists.packetizer.com/pipermail/sg16-avd/1999-May/015998.html, retrieved Aug. 15, 2014, 3 pages.
Young, Debby, "Unified Conferencing: Polycom eliminates connection boundaries to distance conferencing," CIO Magazine May 1, 2003, www.cio.com, 1 page.
Spectel Announces Launch of Industry's Largest-Ever Conferencing Bridge; New Fully Integrated Confertel 7000 Bridge Offers Up to 4,080 Ports PRNewswire, http://www.prnewswire.com/ , retrieved Aug. 26, 2014, 2 pages.
Portway, et al, The Education Coalition; Corporate Training from "A Technical Guide to Teleconferencing and Distance Learning," 3rd Edition, retrieved Aug. 27, 2014, 56 pages.
Summers, Bob, Official Microsoft NetMeeting Book, Microsoft Press, ISBN 1572318163, 9781572318168, 363 pages.
In the United States District Court for the District of Colorado—Civil Action No. 12-cv-0291-CMA-KMT, *Broadnet Teleservices, LLC, Plaintiff* v. *Shoutpoint, Inc., and Victory Solutions, LLC*—Defendent Shoutpoint, Inc.'s Answer, Affirmative Defenses, and Counterclaims to Plaintiff's Complaint for Patent Infringement, Complaint dated Nov. 6, 2012, 10 pages.

* cited by examiner

FIG. 3

| | | | | | |
|---|---|---|---|---|---|
| ☐ | ○ | BARRETT HINTON | (899) 100-8366 | | 20M |
| ☐ | ○ | SAMANTHA LANG | (899) 100-0297 | | 19M |
| ☐ | ○ | TAMERA THOMAS | (899) 100-8021 | | 19M |
| ☐ | ○ | BAMBI VALDEZ | (899) 100-0290 | 302 | 19M |
| ☐ | ○ | MACKENZE E JORDAN | (899) 100-0056 | | 19M |
| ☐ | ○ | TARSHA PPCE | (899) 100-8363 | | 19M |
| ☐ | ○ | TAMICA SWANSON | (899) 100-9018 | | 18M |
| ☐ | ○ | CARRY FAULKNER | (899) 100-8357 | | 18M |

ADD CHECKED TO Q&A | HANGUP CHECKED

HANGUP ALL

| ANSWER | KEY | VOTES | PERCENT |
|---|---|---|---|
| YES | 1 | 4 | 50% |
| NO | 2 | 4 | 50% |
| TOTAL VOTES: | | 8 | ☒ |

[NEW] [MODIFY] [SAVE]

| | | | | |
|---|---|---|---|---|
| ○ | □ | RAYMOND J WILD | (303) 333-0004 | | 35M |
| ○ | □ | FRANK R MUSHOW | (303) 333-0005 | | 35M |
| ② | □ | DANIEL NELSON | (303) 333-0006 | WANTS TO TALK ABOUT IMMIGRATION | 35M |
| ① | □ | CHARLES P RALEGH | (303) 333-0007 | WANTS TO ASK ABOUT RAISING THE EDUCATION RANKINGS | 35M |
| ○ | □ | DALE E PLASSE | (303) 333-0008 | AGREES WITH CONGRESSMAN | 35M |
| ② | □ | WILLIAM ZILINSKY | (303) 333-0009 | WHAT IS YOUR STANCE ON THE WAR | 35M |
| ○ | □ | DAVID D NEWCOMB | (303) 333-0010 | FORMER MILITARY | 35M |

[ADD CHECKED TO Q&A] [HANGUP CHECKED] [HANGUP ALL]

TELEFORUM PARTICIPANT SCREENING

RELATED APPLICATIONS

This application claims benefit of priority to U.S. Provisional Patent Application No. 60/825,248, entitled "Teleforum Apparatus and Method," and filed Sep. 11, 2006, which is specifically incorporated by reference herein for all that it discloses. This application further is a continuation of U.S. patent application Ser. No. 11/853,638, entitled "Teleforum Apparatus and Method," and filed Sep. 11, 2007 now U.S. Pat. No. 8,266,535, which is specifically incorporated by reference herein for all that it discloses. This application still further is related to U.S. patent application Ser. No. 13/224,706 entitled "Conference Screening," and filed on Sep. 2, 2011, which is specifically incorporated by reference for all that it discloses.

TECHNICAL FIELD

The present invention is directed toward an apparatus and method for providing a teleforum, and more particularly toward a teleforum apparatus and method where teleforum participants may request and be granted active participation in the teleforum and persons who were not directly dialed by the teleforum system or those who missed the initial call from the teleforum system may initiate a call requesting participation in the teleforum.

BACKGROUND

Historically, systems capable of generating large volumes of automated calls have differed in hardware and software from those systems used to bridge participants on an audio teleconference. In addition, the hardware and software required to manage an audio teleconference are often priced an order of magnitude or more above the cost of hardware and software used to generate large volumes of automated calls on a per-phone-line basis.

Furthermore, the limited capacity of a typical audio conferencing bridge prevents deploying the requisite number of phone lines to effectively make the many outbound calls required to achieve a large sized audio teleconference (10-100,000 conferees).

Audio conferencing bridges also have heretofore consisted of a single device, or in some cases a series of tightly-interconnected devices which must be co-located in the same facility. Currently available conference bridges can not incorporate equipment located in geographically disparate locations in the same manner as those co-located in the same facility. Thus, presently available conferencing bridges are only capable of handling a few hundred conferees; In instances where more conferees than the limit are required, bridges must be either physically located in the same location, or, if they are in disparate locations must be controlled separately and have voice paths joined together by a manual process, resulting in loss of quality and cumbersome dispersed control of the conference by multiple operators who must be extensively trained in the management of multiple conference bridges.

Typical smaller teleconferences provide for each conference participant to listen to other participants, and provide voice input to the conference. Such typical smaller teleconferences thus require approximately twice the hardware resources of a large "listen only" conference. Presently available conferencing bridges capable of allowing large calls of multiple thousand participants do not provide for the placement of some or all conference participants into an initial listen-only mode which may be converted upon request to a full two-way participation mode under the control of the teleconference operator.

The present invention is directed toward overcoming one or more of the problems discussed above.

BRIEF DESCRIPTION OF THE DRAWINGS

FIG. 3 is a screen capture showing a control interface screening view;

FIG. 4 is a screen capture showing a control interface CapitalCall™ view;

FIG. 5 is a screen capture showing a control interface reduced live view suitable for a host.

SUMMARY OF THE EMBODIMENTS

Figure 1A:
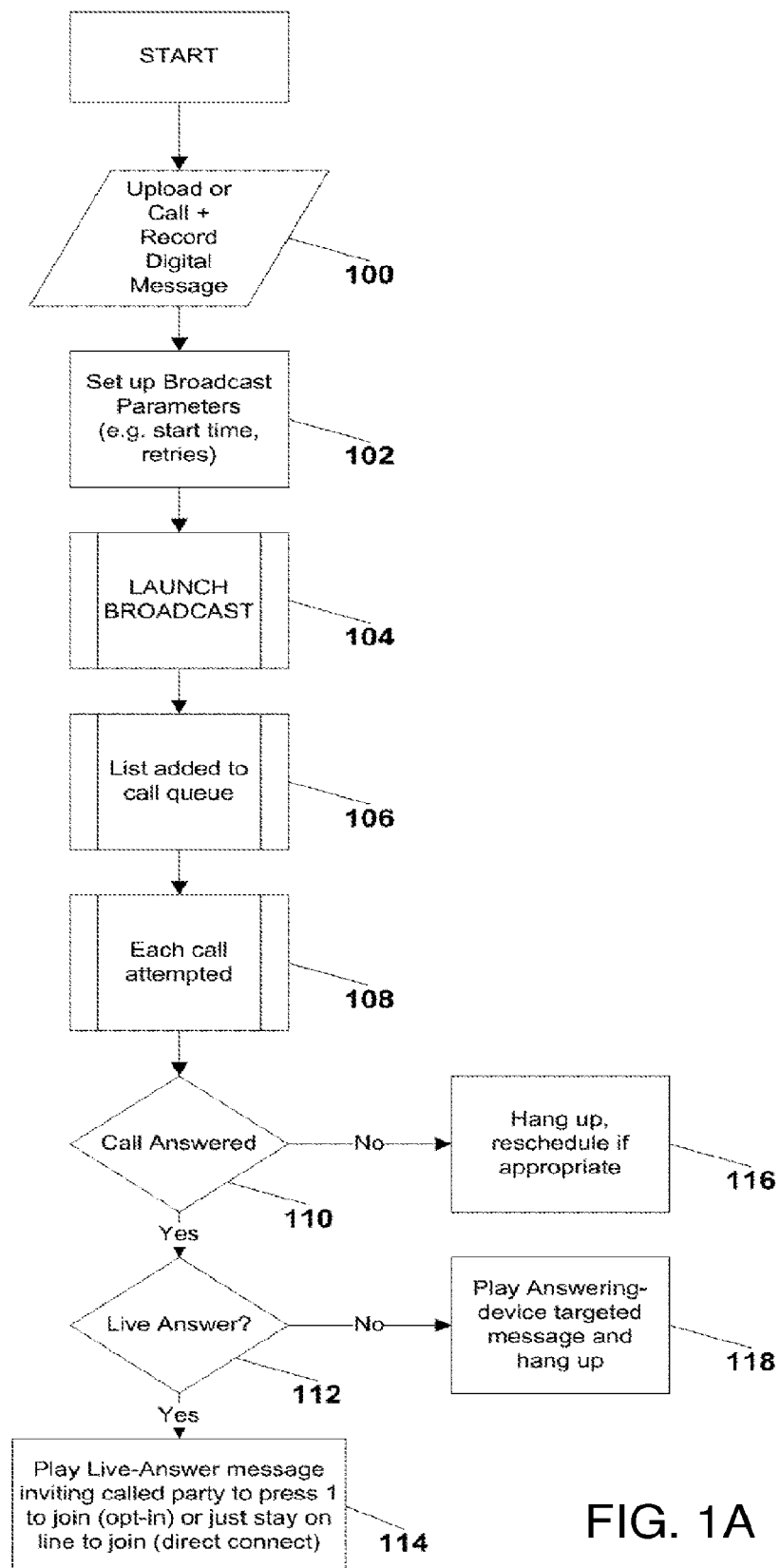
FIGS. 1A and 1B are a flow chart detailing certain steps of a method disclosed herein.

One embodiment is a method of providing a teleforum. The method includes generating simultaneous outbound invitation calls to multiple invitees and transmitting a message to each invitee, inviting him or her to become a teleforum participant. Teleforum participants who accept the invitation are connected to the teleforum in a listen-only mode. During the teleforum, a teleforum participant may request active participation in the teleforum. The method also includes allowing the participant to actively participate in the teleforum. Active participation may include but is not limited to such activities as: speaking to the teleforum, asking a question, responding to a poll, making a donation, providing information, leaving a message, being transferred to a subconference, receiving feedback from participants, leaving a voicemail, volunteering for future activities or receiving media transmitted outside of the teleforum.

The method may also include displaying information related to the teleforum on a multi-user computer interface. Typically, the multi-user computer interface will be displayed on various computers maintained by those with authority to control some aspect of the teleforum. The various computers displaying the multi-user computer interface may be widely separated geographically. The information displayed on the interface may include, but is not limited to, the identification of or other personal information concerning teleforum participants, the status of participants requesting active participation, poll results, donation status, feedback from participants, the identity of participants who are actively participating, the screening status of participants requesting active participation, and the general status of the teleforum. The activities listed above may also be controlled using the multi-user computer interface.

The method of providing a teleforum may also optionally include screening one or more participants prior to allowing a participant to actively participate in the teleforum. More than one screener may be involved in the administration of the teleforum, and each screener may contemporaneously screen selected participants who have requested active participation. Screening may be done utilizing the multi-user computer interface described above.

The method of providing a teleforum may also include communicating with selected teleforum participants in a private subconference, separate from the teleforum. The number of participants who may actively participate in any teleforum activity at a select time may be limited.

Another method of providing a teleforum includes generating simultaneous outbound invitation calls to multiple invitees and transmitting a message to each invitee, inviting him to become a teleforum participant as described above. In this embodiment however, calls from persons who self-initiate their own inbound calls requesting to become a teleforum participant are also accepted. Both invitees and self-initiated callers may be connected to the teleforum in an initial listen-only mode. According to this embodiment, call-in information may be provided to a group of persons who are likely to self-initiate inbound calls to the teleforum. The call-in information may be an appropriate telephone number, a teleforum date and time, a personal identification number or access code or other similar information. Call-in information may be distributed by any means, including but not limited to direct mailing, e-mail, facsimile transmission, telephone call, radio advertisement, print media advertisement, internet advertisement, and television advertisement.

Another embodiment is a virtual conferencing bridge for providing a teleforum. The virtual conferencing bridge includes a voice response unit (VRU) in communication with multiple communication pathways. The virtual conferencing bridge also includes a teleforum bridge in communication with the VRU and a control interface in communication with both the VRU and the teleforum bridge. The VRU may be in communication with the teleforum bridge through multiple content channels. Alternatively, the VRU may be in communication with the teleforum bridge through only one content channel and through which individual channels may be bridged on dedicated proxy channels.

The virtual conferencing bridge may include multiple VRUs associated in one or more clusters with each VRU being in communication with the teleforum bridge. Each cluster may be associated with at least one cluster-located web application server, and at least one cluster-located database server, which servers provide instructions and data to each VRU in the cluster. The virtual conferencing bridge may feature each cluster being located in a geographically separate region.

The virtual conferencing bridge may also include a master web server and a master database server in communication with the servers located at each cluster. The master web server and the master data server may communicate with the cluster-located servers through a public, private or virtual private network (VPN).

Communication between the control interface and the VRU may include a control communication path and a content communication path. The control communication path may in turn include a master web server, a master database server, a cluster-located web application server and a cluster-located database server linked with a public, private or virtual private network.

DETAILED DESCRIPTION OF THE INVENTION

A. Method Overview

Figure 1B:
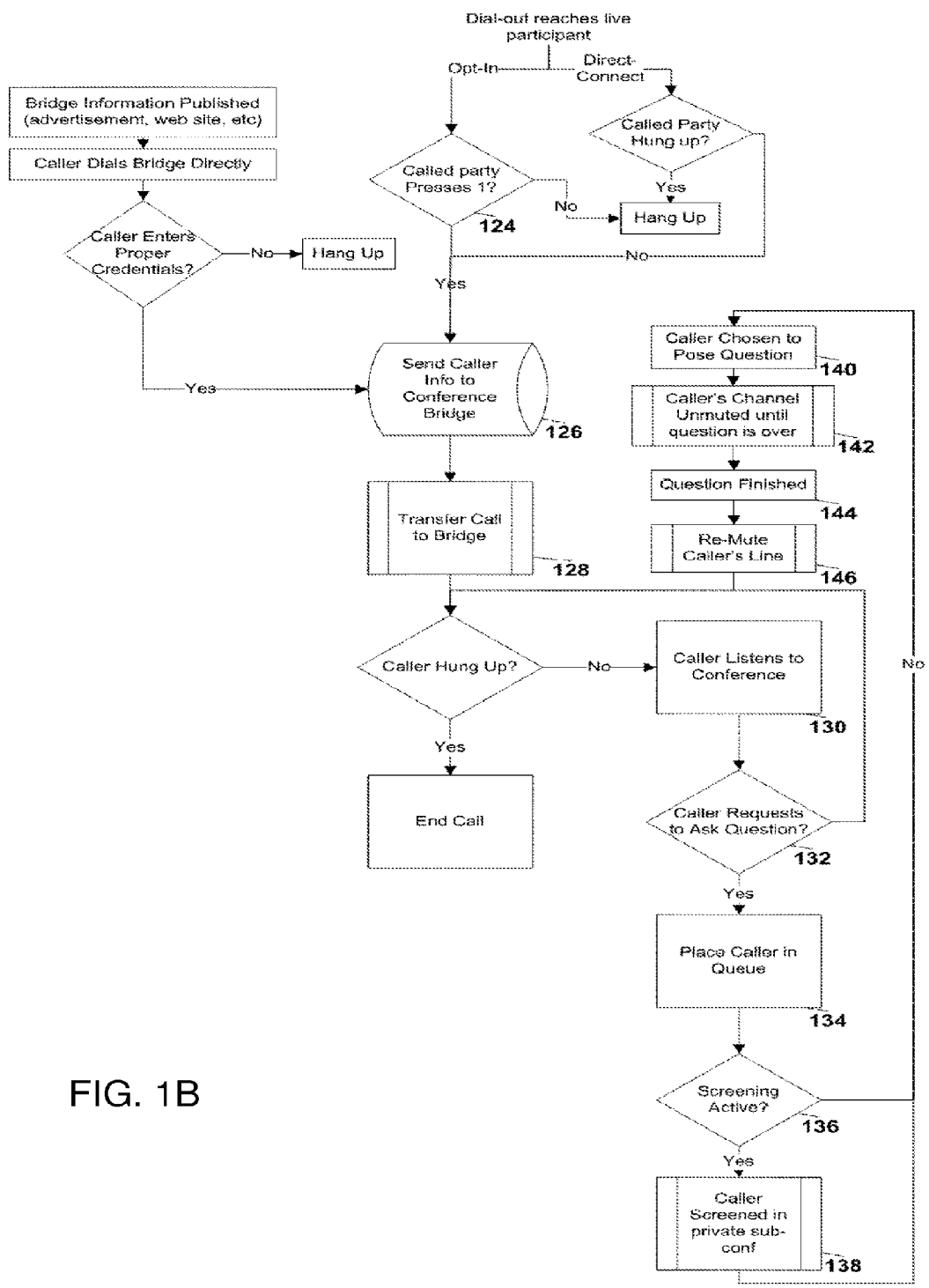

A method of conducting a teleforum as disclosed herein is illustrated in the flow chart of FIG. 1. The teleforum process begins before any outbound calls are made to invite participants. Initially, a system operator loads both an outbound calling list of digital names and phone numbers and an electronically digitized sound file into the automated outbound calling system (Step 100). In addition, the system operator programs or establishes the broadcast parameters for the teleforum (Step 102). For example, the system operator may select the start time for outbound calling, the number of times to attempt an invitee telephone number, or similar items. Other features described in detail below may be programmed at this stage. Prior to the commencement of the teleforum, hosts, screeners, support people, and select participants (possibly selected for the purpose of asking "planted" participant questions) may dial in to the teleforum system for a "pre-conference" during which strategy, tactics and details concerning the overall teleforum are discussed. The operator may launch the outbound calling process (Step 104) upon learning that all hosts, screeners, and other authorized persons are ready to begin. As is described in detail below, the operator will launch the call on the system, which includes any number of independent but interconnected automated dialers, each of which is capable of calling a particular number of called parties. The system disclosed herein may scale from 1 to millions of persons called simultaneously. Outbound calls are queued and made (Steps 106-108). As outbound calls are made and answered (Step 110), the system may recognize, through frequency analysis, speech recognition, or other means, that it has reached a live person (Step 112). If a live person is reached, the system may play the previously recorded digitized sound file to the called party; this sound file typically invites the caller to provide input, for example, press 1, say a particular phrase, or just stay on the phone line to join a live teleconference (Step 114). When the computer recognizes that the caller has provided input expressing a desire to join the teleconference, the steps outlined below begin. Otherwise the system hangs up and makes the subsequent outbound call (Step 116). If the system determines in Step 112 that an answering machine or other recording device has answered the outbound call, the system may play a prerecorded message targeted to an answering machine and hang up (Step 118) or may simply hang up without playing a pre-recorded message.

The system also accepts requests (in the form of phone calls or other user-initiated methods) from parties who wish to join the conference. The system is configured to treat those parties who initiate their own inbound calls the same as parties who have been automatically called by the outbound automated calling system. Each can be a full teleforum participant. Inbound calls may be solicited in advance. For example, a host or system operator may publish a call-in number for an upcoming teleforum (Step 120). The call-in number may be published in the print media, broadcast as part of an advertisement, distributed through direct mail, over the internet or otherwise transmitted to potential teleforum participants. The call in number will typically be associated with a projected time for the start of the teleforum. A special access or PIN number may be required for self-initiated participation. Self initiated inbound callers are connected to the teleforum in the same manner as those who accept outbound calls (Step 122). When self-initiated callers are given individual access codes or PINs (prior to calling in) these codes are solicited when the caller first dials the teleforum. The PIN or access codes allow the teleforum system to identify pre-loaded information relevant to that participant, including the same type of information which may be known about a participant to which the system initiated an outbound call.

Collectively, those parties who were contacted by the system to join the conference (invited parties) and those who have initiated their own connection to the conference (self initiated callers) are referred to as "participants" or "teleforum participants" herein.

In one embodiment of the teleforum apparatus and method, when a participant expresses a desire to join the teleconference, through a touch-tone response, an automated speech recognition command, self-initiated call-in, or by not hanging up (Steps 122-124), the participant's name, phone number, and other pre-loaded information is transmitted via an electronic connection to the traditional conferencing bridge (Step 126). The participant's phone line is then bridged, via a second phone call on a phone line which originates with the bridge, into the live teleforum (Step 128). The participant is typically automatically placed into listen only mode, where the participant can hear the teleforum but cannot be heard in the teleforum. A participant may then, as is described in detail below, request to be allowed to speak, and may be allowed to speak briefly by opening the participant's transmitting voice channel into the teleforum and then shunting it again to return the participant to listen-only mode. In addition, a participant may be screened by someone managing the call by taking that participant's individual bridging line and joining it into a secondary conference referred to as a "sub-conference" between the screener and the participant, to verify the participant's identity, determine the appropriateness of the participant's question, and otherwise gather information.

In another embodiment of the teleforum apparatus and method, when a participant expresses the desire to join the teleconference (Step 124), that party's individual phone line is joined in a listen-only fashion. For example, the transmission line which transmits voice signals to the participant is connected, but the transmission line which transmits voice signals from the participant is shunted along with all other phone lines from other participants who wish to join the same conference. Thus all participants are initially joined into the conference in a like manner, such that they can hear the conference but cannot be heard in the conference (Steps 126-130). The alternative connection method includes utilizing a monitoring phone line which is monitoring the transmission of the live voice conference but does not have input capability and transmitting the monitoring channel's audio signal including the live conference audio collectively to all participants who have joined the conference. The transmission channel from the participants is typically shunted so that no transmission from this channel can be heard in the teleconference. In addition, the monitoring phone line may be part of a staged implementation where the transmitted audio signal is in turn derived from another monitoring channel to minimize the required number of conference bridge ports.

After Steps 100-130 of the method displayed in FIG. 1 have been initially completed, at least one and possibly many teleforum participants are online and listening to the broadcast of teleforum content. It is important to note that new teleforum conference participants may be added to the teleforum at any time during the broadcast according to steps 100-130. However, the remaining steps of the disclosed methods typically occur after broadcast of teleforum content has begun.

During the teleforum, a participant may express a desire to ask a question, make a comment or otherwise actively participate in the teleforum (Step 132). Active participation as defined herein includes, but is not limited to, asking the teleforum host a question, making a comment to all teleforum participants, replying to a poll of teleforum participants, participating in a side conference with a subset of the group of all teleforum participants, making a donation, supplying other non-informational input to the teleforum or otherwise participating in the teleforum beyond merely listening to the content provided by the host. The request by the participant to actively participate in the teleforum may be made through touch tone keypad input, spoken voice command or otherwise. Upon receipt of a request for active participation to be unmuted to ask a question or make a comment, the participant is placed into a queue (Step 134) where any relevant information known about the participant is listed. One or more screeners who are able to monitor all participants who have joined the queue may then bridge the participant's phone line into a separate sub-conference to privately confirm the caller's identity and appropriateness of his comment, question or other active participation (Steps 136-138). The sub-conference is accomplished by removing the participant's phone line from the collective group of listening phone lines, and connecting the participant's phone line in a full-duplex fashion to the sub-conference. In the full duplex mode, both the speaking and listening transmission lines for the participant are connected to the sub-conference, such that the screener may ask questions and mark the relevant answers and information into the caller's software record. Participants being screened, as well as the screeners, may optionally hear the audio teleconference at a reduced volume during the screening sub-conference in order to monitor what is happening in the teleforum. When the screening is finished, the participant may be returned to the previous state of listening to the live conference collectively with the other parties who have been called, or the participant's active participation may commence, as described in detail below. At this point, the screener may remove the participant from the queue (indicating that the participant should not be allowed to speak in full-duplex into the conference) or may place the participant back into the queue along with any information gleaned from the participant during the screening process; for example, this may include the participant's desired question or comment, common name and pronunciation, and any notes the screener deems relevant such as "sounds angry" or "met you last week".

During the teleforum, a participant may express a desire leave the teleforum, and may either simply end his connection (hang up a phone, for example) or may input a particular voice or key sequence indicating a desire to leave the conference. The system may solicit a voicemail response from the participant asking for feedback, follow up questions, or any other information relevant to the sponsor, host, or other individual or entity.

To enable multiple participants to be screened at once, each participant may have a dedicated, two-way "proxy channel" connected to a screening node which is capable of initiating a direct, one-to-one full-duplex connection with a screener's individual channel. This eliminates the requirement for the isolated sub-conference discussed above, and provides for multiple participants to be simultaneously screened by multiple screeners.

Often, a teleforum host will solicit active participation from teleforum participants. For example, a teleforum host may ask the participants if they have any questions. Frequently, the announcement to the teleforum participants of the availability of transfer into an active participation mode will cause a large number of transfer requests. The large number of contemporaneous transfer requests will overwhelm the phone number(s) to which they are being transferred. As a result the system can be configured to only allow a maximum number of simultaneous transfers to take place. For example, if the request for active participation results in a teleforum participant being transferred to a host's campaign headquarters, and only fifteen volunteers are prepared to answer transferred calls, the system can be configured to allow no more than fifteen participants to transfer at a given time. The sixteenth person may be placed into a queue for the next available active participation slot. When one of the original fifteen active participants completes their active participation (typically this person would be placed back into the listening mode of the teleforum), the sixteenth person may then be transferred for active participation.

When the conference chairperson or host has determined that it is appropriate to allow a pre-screened participant to speak to the teleforum to ask a question or make a comment (Step 140), the chosen participant's phone line is again removed from the general listen-only collective and connected directly, and in full-duplex, with a third phone line which in turn has a full-duplex connection into the teleconference (Step 142), allowing the participant to speak to the teleforum and to hear anyone else who is speaking to the teleforum simultaneously. When the screening node based multiple-screening method described above is utilized, the participant's channel may be connected via a dedicated, shared full-duplex proxy channel which resides on the screening node for the purpose of allowing a participant to speak to the teleforum. When the participant's question or other active participation is finished (Step 144), the conference chairperson or host may re-mute the active participant's line (Step 146) and return them to listen-only mode.

B. The Control Interface

The methods generally described above may be implemented with a control interface for the teleforum which allows an expert or novice to control the various aspects of the teleforum. The control interface allows the selection of parameters surrounding the initial broadcast of simultaneous calls. The control interface also provides for the management of participants who have elected to actively participate in the teleforum. The control interface includes the ability to screen and un-mute individual participants, and provides for various other functions described in further detail below. The control interface causes the transmission of commands and data via a data network such as the internet or other private or public data networks in communication with the individual conference bridge media servers as well as the automated calling machines. The control interface also gathers and displays data about the status of various participants and the teleforum in general. The control interface may be used to present data in a usable fashion to the teleforum chairperson, host or screeners. In addition, the interface provides for instructing media servers and calling machines to manipulate the participants and teleforum in particular ways to enable smooth and effective communication among all participants.

Thus, the control interface instructs the conference bridge media servers and automated calling machines to perform specific tasks. The various status and control features of the control interface may be graphically displayed as shown on the screen capture images of FIGS. 2-5.

Figure 2:
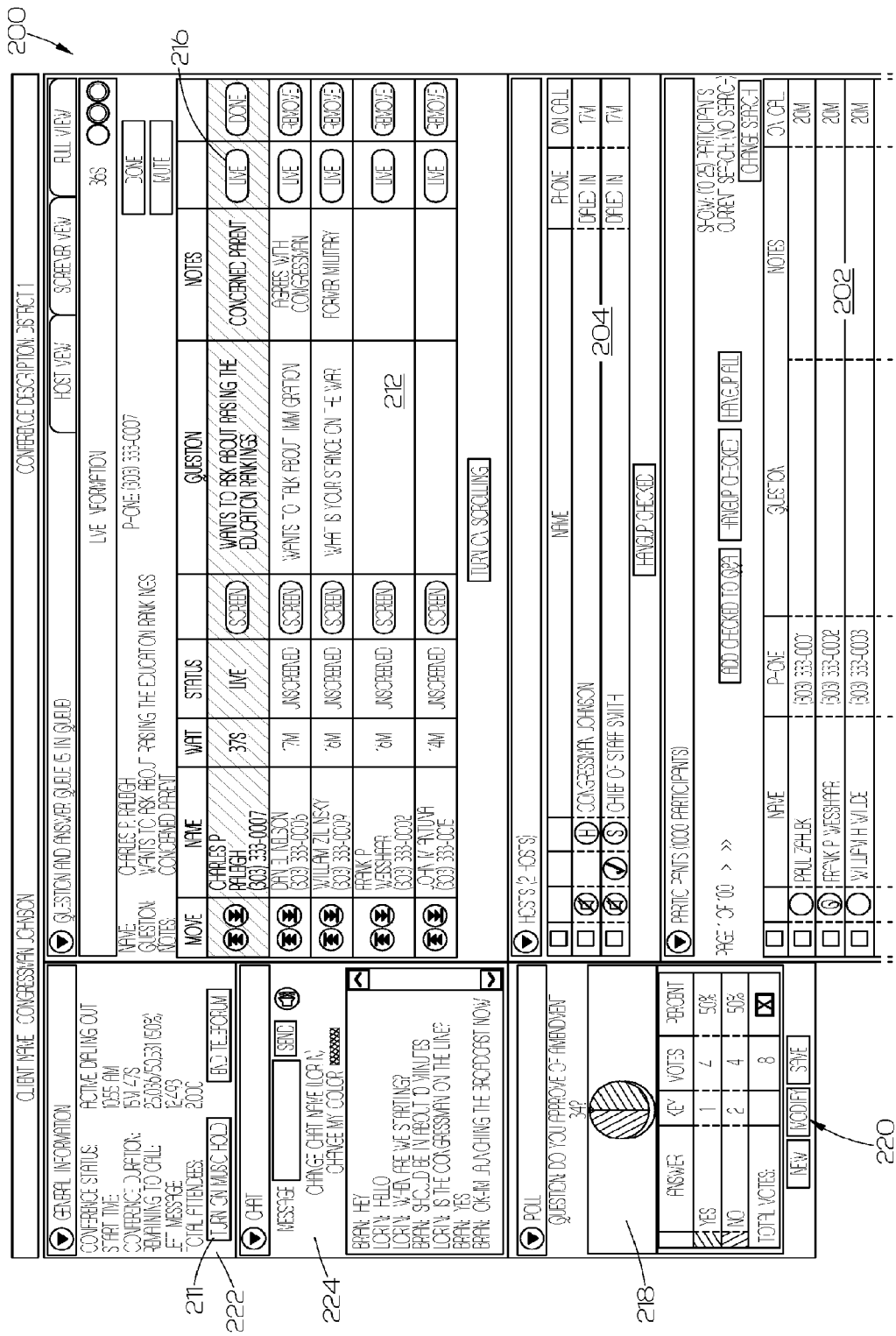
FIG. 2 is a screen capture showing a control interface live view.
Figure 2:
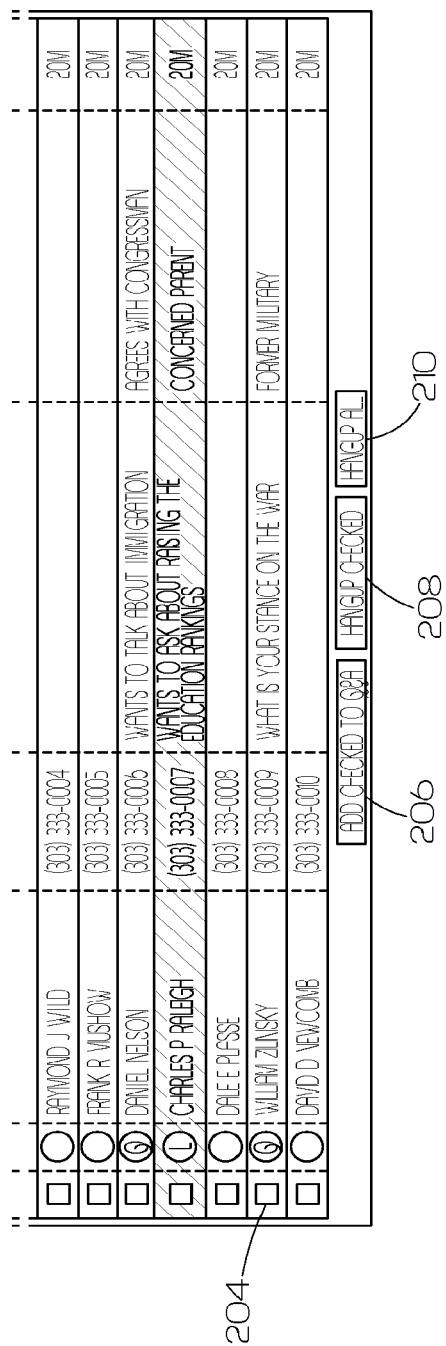

For example, FIG. 2 is a screen capture illustrating the control interface as presented to a teleforum chairperson or host when a teleforum is live. The control interface as illustrated in FIG. 2 is referred to as a "live view" 200 herein.

The live view 200 includes control and data fields such as the participant field 202 which displays the names, phone numbers and other relevant details relating to all teleforum participants. This field may contain some or all of the information known about the participant prior to the call as well as some or all information learned about the participant through the screening process, through the participant's comment or question live into the conference, or added by anyone who is allowed to use the control interface. This information may include, but is not limited to, the following details related to the participant: first, last, middle, and common name, all known names and ages of others in household, screener notes from this and past teleforums, address, neighborhood, phone number, zip code, congressional district, party affiliation, state, age, race, ethnicity, gender, individual or household income, size of household, tax bracket, voting record, volunteer record, past campaign contributions, email address, length of participation, past questions asked in this and other teleforums, history of political activity (rallies), history of participant specific to host's office (e.g. case work), answers to various poll questions in this and previous teleforums, transfer and donation history from this and previous teleforums, means by which participant was reached (e.g. dialed-in, VoIP, Skype, Internet Broadcast, Mobile phone, home phone, work phone, prison phone, hotel phone), consumer habits, military status and history. The participants field 202 includes controls which provide active control functionality over the participants' respective connections to the teleforum to the teleforum chairperson or host. For example, checkboxes 204 allow a conference chairperson or host to select a subset of participants for further processing. Control buttons 206-210 provide for active participant control. In particular, button 206 allows a chairperson, host or screener to add the checked participants to the question and answer queue. Control button 208 allows the chairperson or host to hang up on or otherwise end the participation of selected participants. Similarly, control button 210 causes the chairperson or host to hang up on all participants. Similar functional buttons may be used to place specific participants or groups of participants into a separate private sub-conference, place specific participants or groups of participants into music hold (control button 211) or otherwise terminate the selected participants' ability to hear the teleforum. Thus the control interface provides for the active participation, termination or other control of selected participants or groups of participants.

As described above, control button 206 allows a conference chairperson, host or screener to transfer one or more selected participants into a question and answer queue, which is displayed as a question and answer queue field 212. Some of the participants who are displayed in the question and answer queue field 212 have already been screened as is described in detail herein. The question and answer queue field 212 therefore lists the teleforum participants who are waiting to ask prescreened questions along with details of the question itself, notes and other status information. Functional buttons 214 are provided to allow the chairperson, host, or other authorized party to select among the prescreened or unscreened teleforum participants, or to place them in an acceptable order for asking questions or other active participation. Other functional buttons 216 are provided to open a two-way connection between a selected participant or sub-group of participants and the teleforum, change details about a participant (including name, question, or notes as shown).

Figure 3:
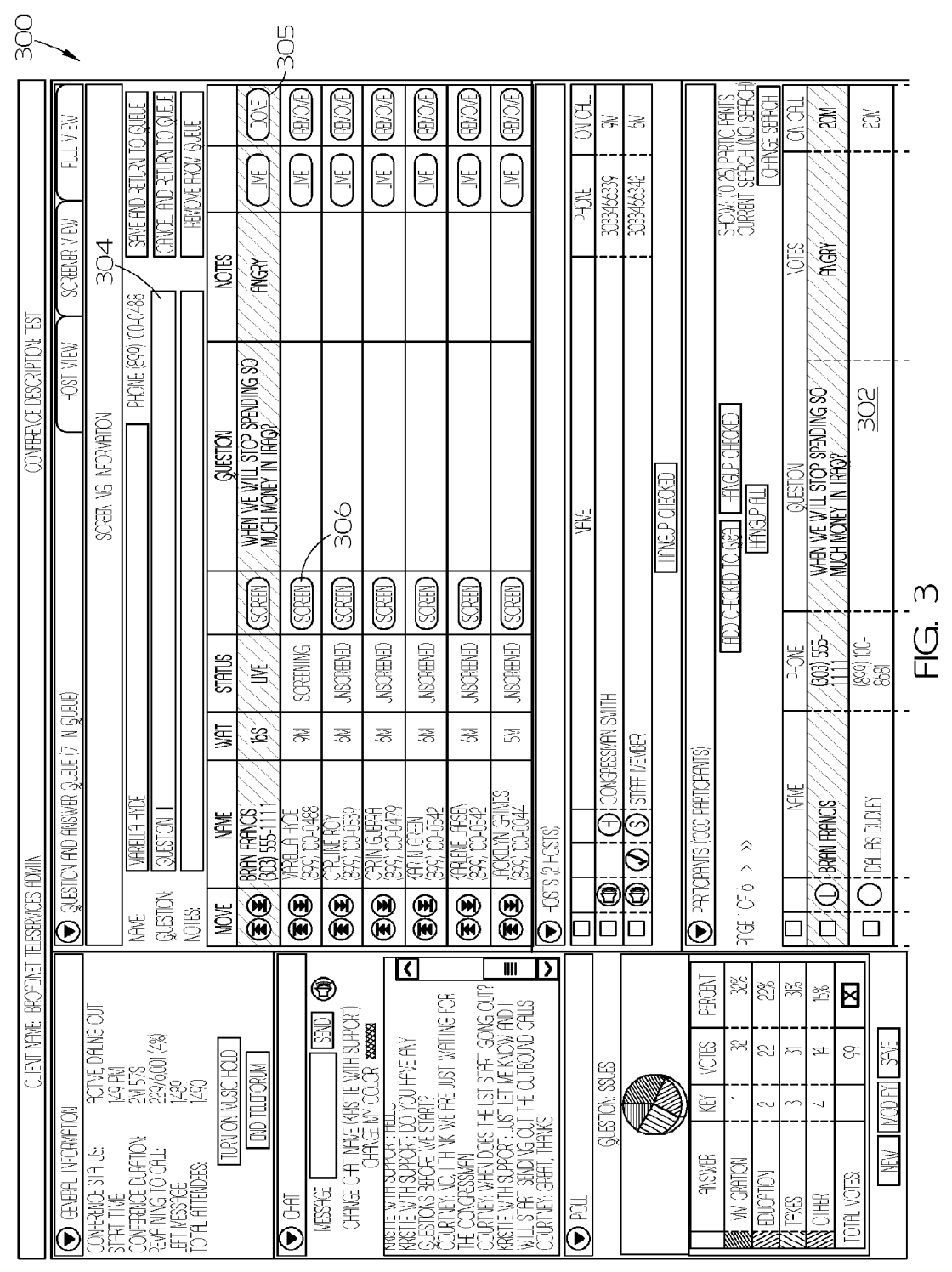

A screener view 300 of FIG. 3 shows a screen capture of the control interface as might be viewed by a call screener who serves to screen questions or other requests for active participation submitted by participants. The screener may audibly screen a specific participant in a separate private screening teleconference. The screener may select participants from a participant field 302 which is similar to the participant field 202 shown in the live view 200. In the screener view 300, however, data input fields 304 are provided where the screener may input specific participant comments or questions or other information solicited in the private teleconference. As discussed above, multiple screeners may be selecting participants from similarly displayed participant fields 302 at multiple screening stations at the same time. The multiple screeners may use control interface functionality such as a "done" button 305 associated with the screening view 300 to place selected participants and their questions or other input into the question and answer queue 212 shown on the live view for subsequent processing by the host, chairperson, or other authorized party.

One type of participant request for active participation is an audibly delivered question or comment delivered to the host and teleforum as described in detail above. The methods described herein provide for various other types of active participation. For example, all participants may be presented with a poll question at some time during the teleforum. The host may directly poll the participants during his or her presentation. Alternatively, the poll question might be delivered as an automated message. The participants' response to the poll may be rendered through a touch-tone key press or through other means such as speech recognition. For example, in the live view 200 of FIG. 2, a poll field displays the ongoing and continuously tabulated results of a current poll. Control buttons 220 allow the chairperson or host to being tabulating a new poll, modify the poll or save results. Control buttons 220 also allow the host or other authorized party to see which answers were given by individual participants and to save a snapshot representing the current state of all answers to the current poll for later review.

Several of the features of the methods disclosed herein are accessed by transferring a participant to a sub-conference. For example, the conference chairperson may connect individual participants with each other in smaller sub-conference groups for the purpose of fostering more intimate communication among participants. The chairperson or screeners may solicit extended information from individual participants including transferring participants or groups of participants to specific outside phone numbers or other audio or multimedia channels to take a donation, answer survey questions, communicate with support staff, or gather additional information. The control interface provides for the chairperson, host or screener to transfer a selected participant into a separate sub-conference. For example, the screen button 306 in the question and answer queue field 304 of the screener view 300 shown on FIG. 3 will transfer the selected participant into a separate screening conversation with one of the screeners. Similarly, the live button 216 of the live view 200 will connect a participant to the entire teleforum.

Figure 4:
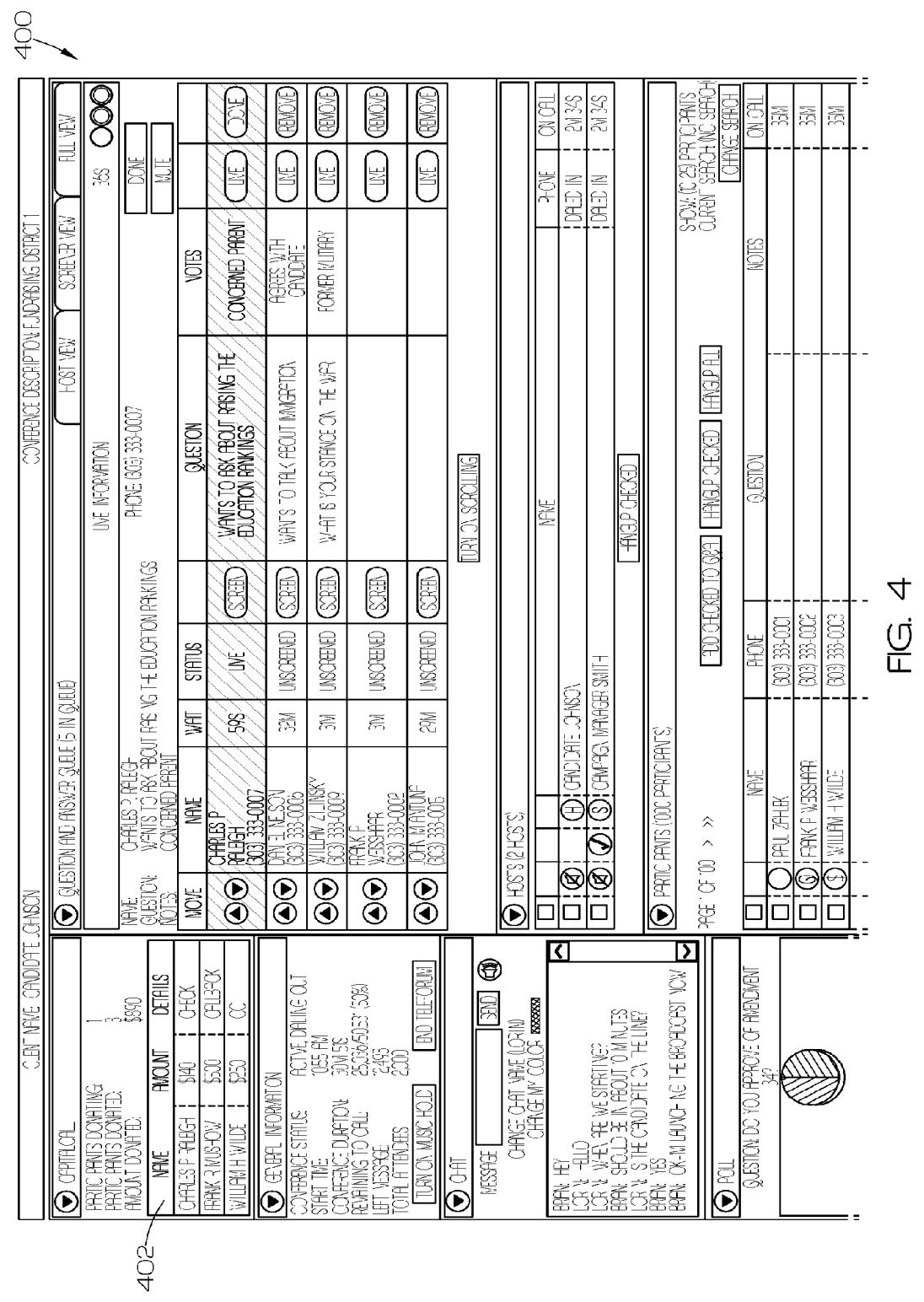

The host, chairperson, or other authorized party may also solicit active participation which does not involve providing voice or data input to the teleforum. For example, the host may, during the teleforum, request that interested participants leave the teleforum momentarily to make donations. The participant may be instructed to press a specific key on their touch tone phone pad or otherwise indicate that they want to actively participate in this manner. The participants who desire to actively participate in the request for donations are transferred to an operator or automated system configured to accept credit card information or to provide an address for the mailing of a donation by check. FIG. 4 is a screen capture of a CapitalCall™ view 400 which would typically be displayed to the chairperson or host during a request for donations. Of particular interest is the CapitalCall™ field 4 where data concerning the progress of the ongoing request for donations is displayed to the host. Thus, the host may provide periodic real-time progress reports to other teleforum participants to enhance the effectiveness of the request for donations.

Figure 5:
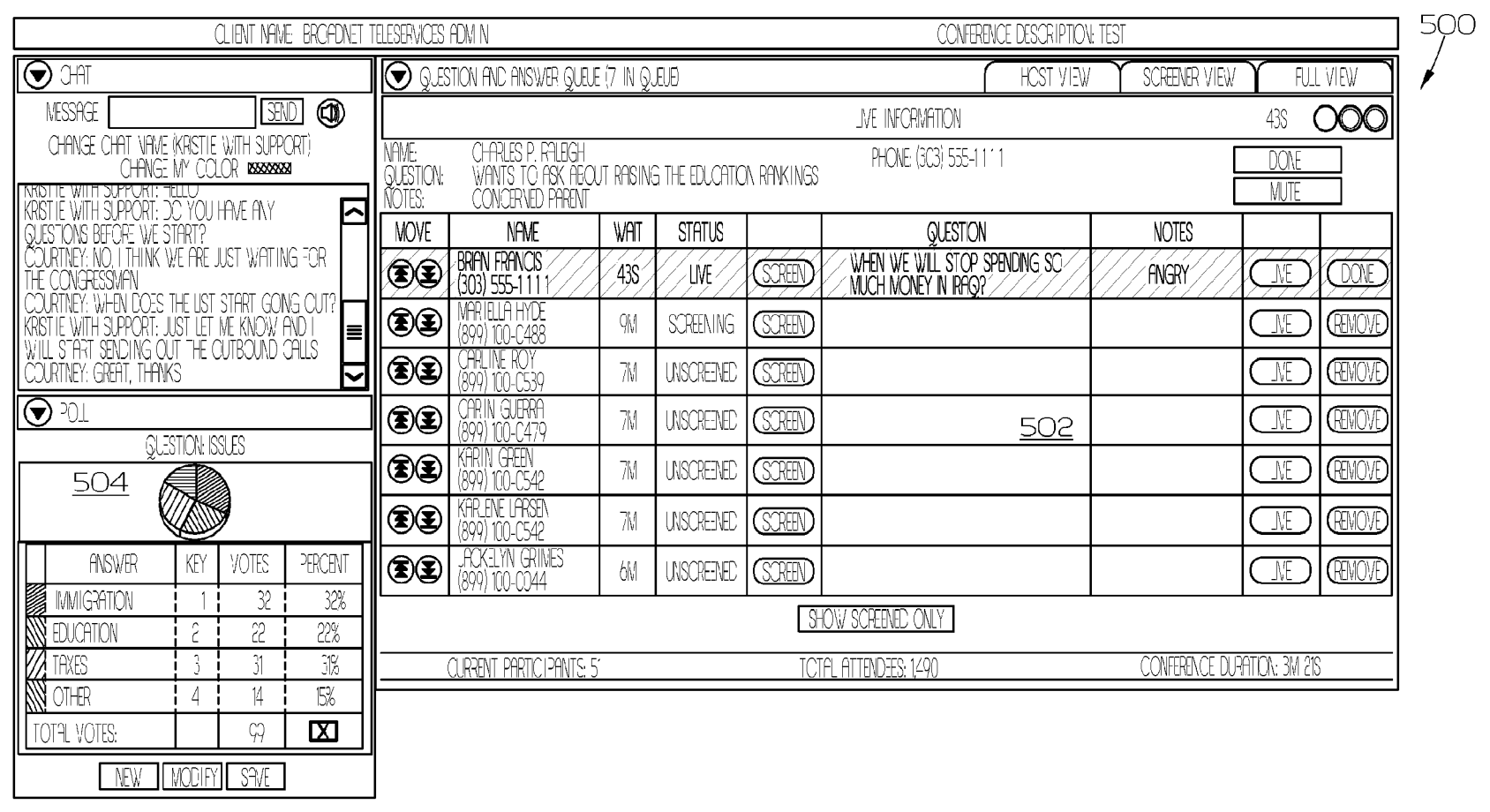

The control interface may be selectively configured to provide more or less information as is suitable for various persons having responsibility for the control of the teleforum process. For example, FIG. 5 is a host view 500 which includes a question and answer queue field 502 and a poll result view field 504 and other information which is critical to effective functioning as a teleforum host. Fields such as general information 222 and technical chat 224 as illustrated on the live view 200 which contain information most suited to a conference chairperson or technical staff but which is potentially distracting to the host may be removed from selected view. A special limited interface may be utilized to allow an observer to see all participants in a particular teleforum, and witness the teleforum dynamic, but without any ability to take any action which affects the teleforum, or modify any relevant data.

When the host or other authorized party has determined that the teleforum should be ended, the system simultaneously instructs all nodes and clusters to terminate all participants (and optionally, all screeners and hosts as well). At this conclusion of the teleforum, all participants may be invited to leave a voice message for the host or other party. These messages are made available immediately to the host or other authorized party to be listened to or downloaded as a digitized voice file via the interface, or via a phone call made by or to the host or other authorized party.

C. System Configuration

Figure 6:
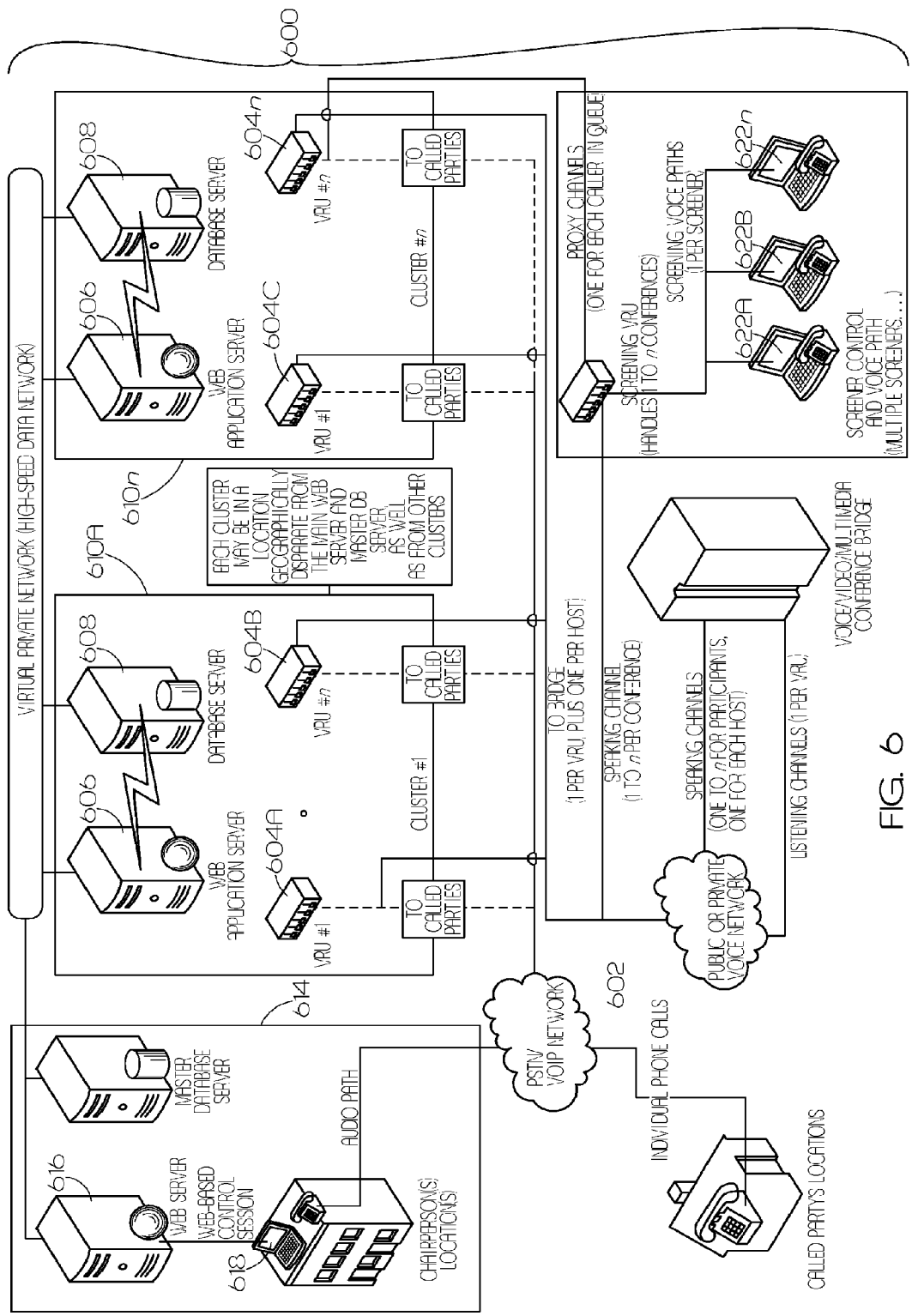
FIG. 6 is a schematic diagram of a system consistent with the present invention.

FIG. 6 is a block diagram illustration of one possible system 600 suitable for implementing the methods described herein. The system components are separated into four distinct areas of functionality including:

hardware and software for making and receiving large numbers of simultaneous phone calls, referred to herein as the inbound/outbound system;

hardware and software for managing the multi-channel audio, video, and/or multimedia conference referred to as the conference system;

hardware and software which provides for user control of the inbound/outbound system and conference system via a graphical user interface (GUI) referred to as the interface; and network hardware, architecture and network protocols which allow the inbound/outbound system, conference system, and interface to efficiently communicate in real time in a reliable manner, referred to as the network.

The inbound/outbound system hardware and software are designed to foster automated communication between the inbound/outbound system and one or more participants via the Public Service Telephone Network (PSTN) 602, Voice Over Internet Protocol (VOIP), other public or private voice, video, or data networks, or any combination thereof.

To perform in this capacity, the inbound/outbound system consists of a series of networked Voice Response Units (VRUs) 604A, 604B . . . $604_n$, each outfitted with network connections for inter-process communications as well as connections to the requisite phone, video, or data networks used to connect to participants. VRUs may be grouped to achieve desired capacity. In addition, a common fileserver 606 and database server 608 is shared among each group of VRUs. The group of VRUs plus servers 606 and 608 form clusters 610A, 610B . . . $610_n$.

Each cluster 610A-n may be geographically widely distributed. Regional, nation-wide or intercontinental distribution is accomplished by utilizing high-speed public, private, or virtual private networks such as the Internet to allow for real-time communication and control of the various clusters and corresponding VRUs. Through these networks, communications messages specifically engineered for this purpose use selected protocols, for example SOAP (Simple Object Application Protocol) and AJAX (Asynchronous Javascript and XML) to foster fast, efficient communication among all clusters, VRUs, web servers, and web client computers used for control, which, together with the fileserver 606 and database server 608 provide task information for each VRU 604.

The software which runs on each VRU 604 may be a mix of commercially available software such as an operating system, device driver, database interface driver, etc. and custom-built software which has been written specifically to accomplish the steps outlined herein. The fileserver 606 and database server 608 also may run a mix of commercially available software and customized software written specifically to accomplish methods outlined herein.

When a VRU 604 on the inbound/outbound system must utilize the PSTN 602, the VRU 604 will also include special-purpose Telephony Interface Hardware, control of which is performed by the customized software residing on each VRU 604. The VRU units 604A-604n may also include Voice over IP hardware which facilitates the making of phone calls through VOIP, also controlled by the customized software. Thus, the system 600 may provide through the VRUs 604A-604n in conjunction with a conference system 612 a shared voice path out of the teleforum for any number of participants to listen to. A participant who is actively participating must have an individual voice path both in and out of the conference to avoid interference and allow other participants to hear him speak.

The conference system 612 may be any general purpose audio, video, or multimedia conferencing system 612 which the inbound/outbound system is capable of connecting to in an automated fashion. For more sophisticated automated functionality, customized teleconferencing software may be employed to facilitate advanced automated communication between the inbound/outbound system and the conference system 612.

The master control interface 614 consists of software written to allow observers, chairpersons, operators and technicians to control both the automated outbound phone calls and the real-time teleforum in a coherent, efficient manner. The control software typically runs on a worldwide web hypertext transfer protocol (HTTP) server 616 and utilizes communication messages specifically engineered for this purpose delivered through selected communications protocols to allow users such as a teleforum chairperson to interact with the system 600 through a control computer 618 connected via a public or private TCP/IP network. As described in detail above, the control interface allows hosts, chairpersons or other users to upload and download lists of intended participants as well as audio and video files. The interface 614 allows users to launch, monitor, and change broadcasts of simultaneous outbound calls with the inbound/outbound system. The control software and interface 614 allows users to fully control all aspects of the audio, video, or multimedia teleconference as discussed in detail above. The control software also provides for the collection and analysis of data relating to the inbound and outbound phone calls and the teleconference itself, including call detail records, caller action records, recorded voice and touch tone data including poll responses, queue requests, donations, and other data and information collected or utilized on the inbound/outbound system and the conference system.

In addition to the master control interface 614, the system 600 may include a screener control interface 620. The screener control interface 620 includes multiple screening stations 622A-622n where requests for active participation received from participants may be screened, directed to sub-conferences, or otherwise processed as described in detail above. The screening control interface 620 also includes a screening VRU 624 which provides for each required screening voice path.

The network 626 may include a specially designed topography to provide efficient, reliable communication among the other system components as well as between the observers, host, chairpersons, operators, and technicians utilizing the master control or screening control interfaces 614, 620. Since the various system components must communicate with each other in real time to obtain valuable data and provide effective control, network reliability and speed must be optimized to suit the requirements of the other system components. As described above, the various system components may be placed in geographically diverse locations and communicate through the network 626. System components placed in various diverse locations provide for calls to be dispersed among various telephone service providers and across several backbone segments to avoid fault-line problems, to utilize least-cost routing, and to prevent problems with a single common carrier to reduce capacity when a large number of simultaneous calls required by certain teleforums are attempted.

EXAMPLE

The following example is provided for illustrative purposes only and is not intended to limit the scope of the invention.

Example 1

A host, chairperson or other user performs the following steps to execute a teleforum as described herein:

1. The host, chairperson, or other authorized party obtains a list of names and phone numbers from a selected source (e.g. voter records).

2. The host, chairperson, or other authorized party records or causes to be recorded various audio voice file(s) including a greeting and instructions indicating how participants may join the teleforum. This may also include recording a post-conference prompt requesting participants to leave specific information in a voice message to be delivered to the host, chairperson, or other person(s), and customized "on-hold" sound files (such as music) to be played to participants before the host has begun the substantive portion of the call.

3. The host, chairperson, or other authorized party uploads the list and the audio voice file(s) to the inbound/outbound system via the master control interface 618.

4. The host, chairperson, or other authorized party may optionally instruct the inbound/outbound system to perform automated analysis and modification to optimize the efficiency of the list. For example, the system may remove duplicate or non-existent phone numbers, phone numbers which may not be legal or cost-effective to call, and phone numbers which may be in a geographic region where the teleforum is not relevant.

5. The host, chairperson, or other authorized party then instructs the inbound/outbound system to begin sending calls to all parties on the list. Selected variables for the calling process may be specified including but not limited to:

a. How long to wait for someone to answer;
  b. Particular frequency analysis parameters used to determine if a live person has answered a call;
  c. The frequency and maximum number of any retries of unsuccessful calls based upon the reason for the failure (e.g. busy, no answer, fast busy, operator intercept, system message, dead air, ring-no-answer, facsimile machine answer, etc.).
  d. Which audio or video files to play based upon whether a live person or an automated answering device has answered a call;
  e. Any other questions which the host, chairperson, or other authorized party may deem relevant to ask the participant either before allowing a participant to join the live teleconference, after the participant leaves the live teleconference, or if the participant declines to join the live teleconference. Feedback from the participant may be accepted via touch-tone input or voice;

f. The last point in time at which calls may be made for a live teleconference, after which no more outbound calls are attempted;

g. Other information specific to the broadcast of the automated calls.

6. Participants who are reached, or call in directly and thereby request to join the teleforum are joined into the live teleforum using the system and methods described above. Participants are initially placed into listen only mode, where their voices cannot be heard in the teleforum, but they can hear the input of authorized speakers into the teleforum; Optionally, the host or other authorized party may cause all participants to be placed into music hold until a predetermined number of participants have joined the call. Such music hold may consist of a generic piece of music, a live feed of some sort, or a customized message recorded for this specific teleforum.

7. As participants request permission to ask a question or make a comment, the system provides visual and/or audio cues to a host, screener, chairperson, technician, or operator indicating the participant's desire to ask a question, how long the participant has been on the call and how long he has been waiting to ask a question. Information pertaining to the participant including name, address, phone number, political affiliation, and any other data deemed relevant by the host, chairperson, or other authorized party may also be displayed.

8. The host, screeners, chairperson, operators, technicians, or other parties may use the interfaces 614 and 620 to instruct the conference system 600 to cause particular participants to be placed into private sub-conferences with a screener or chairperson for the purpose of screening the participant's proposed comment or question. Screening may be used to eliminate undesirable comments and questions or to allow the chairperson, screener or host to choose specific participants for active participation based upon the questions or comments proposed by select participants.

9. Those participants who have requested permission to actively participate in the teleforum will have their phone lines un-muted, either one at a time or several at once, in the manner described above. When the chairperson, operator or host deems it appropriate, the participant's line can be again muted to prevent him from speaking further to the teleforum.

10. At any time, a chairperson or host with access to the master control interface 614 may instruct the conference system 600 to disconnect a particular participant or group of participants from the conference.

11. At any time, a chairperson, host or other qualified party with access to the master control interface 614 may effectively end the teleconference by instructing the conference system 600 to simultaneously disconnect all participants from the conference.

12. At any time, the chairperson, host or other qualified party may initiate a spontaneous poll, requesting that participants respond either which touch tone input or verbally to a particular question of importance. Poll results may be displayed in real-time as callers provide answers and the system interprets and collects replies.

13. At any time, the chairperson, host or other qualified person may request that all participants or a group of participants (e.g. those currently in the question and answer queue 212 (FIG. 2)) leave voice messages which may be immediately accessible or which can be reviewed later.

The description of the various embodiments herein have been presented for purposes of illustration and description, but are not intended to be exhaustive or limiting of the embodiments to the form disclosed. The scope of the present disclosure is limited only by the scope of the following claims. Many modifications and variations will be apparent to those of ordinary skill in the art. The embodiments described and shown in the figures were chosen and described in order to best explain the principles of the method and apparatus, the practical application of the method, and to enable others of ordinary skill in the art to understand the various embodiments with various modifications as are suited to the particular use contemplated.

What is claimed is:

1. A method of providing a teleforum comprising:
   connecting a teleforum participant to the teleforum in a listen-only mode;
   receiving input from the connected teleforum participant requesting active participation in the teleforum;
   placing the connected teleforum participant requesting active participation into a queue for screening;
   bridging the connected teleforum participant in the queue into a full-duplex private screening sub-conference with a human screener in response to the placing operation;
   receiving one or both of the connected teleforum participant's identity and the connected teleforum participant's contribution to the teleforum;
   presenting, on a hosting graphical user interface, a listing of connected teleforum participants requesting active participation to a host, the listing including the connected teleforum participant; and
   establishing a full-duplex connection between the connected teleforum participant and the teleforum responsive to authorization of active participation received from the host via the hosting graphical user interface, the authorization of active participation based on one or both of the connected teleforum participant's identity and the connected teleforum participant's contribution to the teleforum.

2. The method of claim 1, further comprising:
   disallowing a full-duplex connection between the connected teleforum participant and the teleforum if the human screener has denied active participation in the teleforum.

3. The method of claim 1, further comprising:
   reconnecting the connected teleforum participant to the teleforum in the listen-only mode, responsive to the establishing operation.

4. The method of claim 1, wherein the bridging operation includes removing the connected teleforum participant from the teleforum or includes reducing the volume of the teleforum output to the connected teleforum participant.

5. The method of claim 1, wherein the bridging operation includes reducing the volume of the teleforum output to the connected teleforum participant such that both the human screener and the connected teleforum participant can hear the teleforum while connected to the private screening sub-conference.

6. The method of claim 1, further comprising:
   providing multiple human screeners that contemporaneously screen multiple teleforum participants requesting active participation in the teleforum.

7. The method of claim 6, wherein the bridging operation includes reducing the volume of the teleforum output to each of the multiple connected teleforum participants such that each of the multiple screeners and the multiple connected teleforum participants can hear the teleforum while connected to private screening sub-conferences.

8. The method of claim 1, wherein the human screener confirms one or both of the connected teleforum participant's identity and the appropriateness of the connected teleforum participant's question or comment for the teleforum in the full-duplex private screening sub-conference.

9. The method of claim 1, wherein the connected teleforum participant's contribution to the teleforum is a question or comment.

10. One or more tangible computer-readable storage media encoding computer-executable instructions for executing on a computer system a computer process for providing a teleforum, the computer process comprising:
    connecting a teleforum participant to the teleforum in a listen-only mode;
    receiving input from the connected teleforum participant requesting active participation in the teleforum;
    placing the connected teleforum participant requesting active participation into a queue for screening;
    bridging the connected teleforum participant in the queue into a full-duplex private screening sub-conference with a human screener in response to the placing operation;
    receiving one or both of the connected teleforum participant's identity and the connected teleforum participant's contribution to the teleforum;
    presenting, on a hosting graphical user interface, a listing of connected teleforum participants requesting active participation to a host, the listing including the connected teleforum participant; and
    establishing a full-duplex connection between the connected teleforum participant and the teleforum responsive to authorization of active participation received from the host via the hosting graphical user interface, the authorization of active participation based on one or both of the connected teleforum participant's identity and the connected teleforum participant's contribution to the teleforum.

11. The one or more tangible computer-readable storage media of claim 10, wherein the computer process further comprises:
    disallowing a full-duplex connection between the connected teleforum participant and the teleforum human screener has denied active participation in the teleforum.

12. The one or more tangible computer-readable storage media of claim 10, wherein the computer process further comprises:
    reconnecting the connected teleforum participant to the teleforum in the listen-only mode, responsive to the establishing operation.

13. The one or more tangible computer-readable storage media of claim 10, wherein the bridging operation includes removing the connected teleforum participant from the teleforum or includes reducing the volume of the teleforum output to the connected teleforum participant.

14. The one or more tangible computer-readable storage media of claim 10, wherein the bridging operation includes reducing the volume of the teleforum output to the connected teleforum participant such that both the human screener and the connected teleforum participant can hear the teleforum while connected to the private screening sub-conference.

15. The one or more tangible computer-readable storage media of claim 10, wherein the computer process further comprises:
    providing multiple human screeners that contemporaneously screen multiple teleforum participants requesting active participation in the teleforum.

16. The one or more tangible computer-readable storage media of claim 15, wherein the bridging operation includes reducing the volume of the teleforum output to each of the multiple connected teleforum participants such that each of the multiple screeners and the multiple connected teleforum participants can hear the teleforum while connected to private screening sub-conferences.

17. The one or more tangible computer-readable storage media of claim 10, wherein the human screener confirms one or both of the connected teleforum participant's identity and the appropriateness of the connected teleforum participant's question or comment for the teleforum in the full-duplex private screening sub-conference.

18. The one or more tangible computer-readable storage media of claim 10, wherein the connected teleforum participant's contribution to the teleforum is a question or comment.

19. A teleforum system comprising:
    a computer processor; and
    a graphical user interface communicatively coupled to the processor configured to:
        connect a teleforum participant to the teleforum in a listen-only mode;
        receive input from the connected teleforum participant requesting active participation in the teleforum;
        place the connected teleforum participant requesting active participation into a queue for screening;
        bridge the connected teleforum participant in the queue into a full-duplex private screening sub-conference with a human screener in response to the placing operation;
        receive one or both of the connected teleforum participant's identity and the connected teleforum participant's contribution to the teleforum;
        present a listing of connected teleforum participants requesting active participation to the human screener, the listing including the connected teleforum participant; and
        establish a full-duplex connection between the connected teleforum participant and the teleforum responsive to authorization of active participation received from the human screener via the graphical user interface, the authorization of active participation based on one or both of the connected teleforum participant's identity and the connected teleforum participant's contribution to the teleforum.

20. The teleforum system of claim 19, further comprising:
    one or more voice response units (VRUs) in communication with multiple communication pathways to multiple teleforum participants, wherein the graphical user interface is in communication with each of the one or more VRUs.

21. The teleforum system of claim 20, further comprising:
    a teleforum bridge in communication with each of the one or more VRUs, wherein the graphical user interface is in communication with the teleforum bridge.

22. The teleforum system of claim 20, wherein the one or more VRUs includes at least one screening VRU that provides voice paths for private screening sub-conferences.

23. The teleforum system of claim 19, wherein the graphical user interface includes one or both of a master control interface and a screener control interface.

24. A teleforum system comprising:
    a processor; and
    a graphical user interface communicatively coupled to the processor, the graphical user interface comprising:

a participant field including one or more teleforum participants connected to a teleforum;

an active participation queue including a subset of the one or more of the teleforum participants requesting active participation in the teleforum; and a status column indicating whether each of the connected teleforum participants are actively participating in the teleforum in full-duplex, bridged to a full-duplex private screening sub-conference, or connected to the teleforum in a listen-only mode.

25. The teleforum system of claim 24, wherein connected teleforum participants bridged to the full-duplex private screening sub-conferences are disconnected from the teleforum in the listen-only mode or the volume of the listen-only mode output to the connected teleforum participants is reduced.

26. The teleforum system of claim 24, further comprising:
one or more data input fields associated with a teleforum participant requesting active participation in the teleforum; wherein a human screener may add information regarding the teleforum participant obtained in a private screening sub-conference with the teleforum participant.

27. The teleforum system of claim 26, wherein the information includes one or more of the teleforum participant's identity, the teleforum participant's question or comment for the teleforum, and any notes regarding the teleforum participant or the question or comment.

28. The teleforum system of claim 24, further comprising:
a done button associated with each teleforum participant requesting active participation in the teleforum, wherein a human screener may select the done button when screening of a teleforum participant is complete.

29. The teleforum system of claim 24, further comprising:
a remove button associated with each teleforum participant requesting active participation in the teleforum, wherein a human screener may select the remove button to remove a teleforum participant from the active participation queue.

30. The teleforum system of claim 24, further comprising:
a screen button associated with each teleforum participant requesting active participation in the teleforum, wherein a human screener may select the screen button to bridge a teleforum participant into a private screening sub-conference.

31. The teleforum system of claim 24, further comprising:
a live button associated with each teleforum participant requesting active participation in the teleforum, wherein a human screener may select the live button to connect a teleforum participant to the teleforum in full-duplex mode.

32. A method comprising:
receiving a request for active participation in a teleconference from a connected teleforum participant in a listen-only mode, wherein the request is displayed in a table on a graphical user interface, the table including a queue of teleforum participants;

selecting the connected teleforum participant for bridging into a full-duplex private screening sub-conference with a human screener via the graphical user interface;

receiving one or both of the selected teleforum participant's identity and the selected teleforum participant's contribution to the teleforum; and authorizing a full-duplex connection between the selected teleforum participant and the teleforum via the graphical user interface based on one or both of the selected teleforum participant's identity and the selected teleforum participant's contribution to the teleforum.

33. The method of claim 1, wherein the listing indicates that the connected teleforum participant has been screened responsive to the receiving of one or both of the connected teleforum participant's identity and the connected teleforum participant's contribution to the teleforum.

34. The method of claim 1, wherein the queue is presented in a screening graphical user interface to the human screener.

35. The method of claim 34, further comprising:
receiving a selection of the connected teleforum participant via the screening graphical user interface.

36. The method of claim 34, wherein the screening graphical user interface is identical to the hosting graphical user interface.

37. The method of claim 1, further comprising:
receiving, via the hosting graphical user interface, an active participation selection of the connected participant from the listing.

38. The method of claim 1, wherein the host is the human screener.

39. The one or more tangible computer-readable storage media of claim 10, wherein the listing indicates that the connected teleforum participant has been screened responsive to the receiving of one or both of the connected teleforum participant's identity and the connected teleforum participant's contribution to the teleforum.

40. The one or more tangible computer-readable storage media of claim 10, wherein the queue is presented in a screening graphical user interface to a human screener.

41. The one or more tangible computer-readable storage media of claim 40, further comprising:
receiving a selection of the connected teleforum participant via the screening graphical user interface.

42. The one or more tangible computer-readable storage media of claim 10, wherein the screening graphical user interface is identical to the hosting graphical user interface.

43. The one or more tangible computer-readable storage media of claim 10, further comprising:
receiving, via the hosting graphical user interface, an active participation selection of the connected participant from the listing.

44. The one or more tangible computer-readable storage media of claim 10, wherein the host is the human screener.

45. The teleforum system of claim 19, wherein the listing indicates that the connected teleforum participant has been screened responsive to the receiving one or both of the connected teleforum participant's identity and the connected teleforum participant's contribution to the teleforum operation.

46. The teleforum system of claim 19, wherein the queue is presented in the graphical user interface to the human screener.

47. The teleforum system of claim 19, wherein the graphical user interface is further configured to receive a selection of the connected teleforum participant via the screening graphical user interface.

48. The teleforum system of claim 19, further comprising:
receiving, via the graphical user interface, an active participation selection of the connected participant from the listing.

* * * * *